(12) United States Patent
Jung et al.

(10) Patent No.: US 12,477,432 B2
(45) Date of Patent: Nov. 18, 2025

(54) METHOD AND DEVICE FOR REPORTING MOBILITY STATE IN MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/996,783

(22) PCT Filed: Apr. 22, 2021

(86) PCT No.: PCT/KR2021/005087
§ 371 (c)(1),
(2) Date: Oct. 20, 2022

(87) PCT Pub. No.: WO2021/215841
PCT Pub. Date: Oct. 28, 2021

(65) Prior Publication Data
US 2023/0156555 A1    May 18, 2023

(30) Foreign Application Priority Data

Apr. 22, 2020   (KR) .................. 10-2020-0048869

(51) Int. Cl.
*H04W 36/32*   (2009.01)
*H04W 76/19*   (2018.01)
(52) U.S. Cl.
CPC ........... *H04W 36/32* (2013.01); *H04W 76/19* (2018.02)

(58) Field of Classification Search
CPC .............................. H04W 36/32; H04W 76/19
(Continued)

(56) References Cited

U.S. PATENT DOCUMENTS 10,980,079 B2 *    4/2021   Huang ................. H04W 88/06
2014/0341192 A1 *  11/2014  Venkob ............. H04W 52/0216
                                                          370/336
(Continued)

FOREIGN PATENT DOCUMENTS

KR   10-2021-0055409 A    5/2021
WO      2017133295 A1     8/2017

OTHER PUBLICATIONS

International Search Report and Written Opinion of the International Searching Authority dated Jul. 23, 2021, in connection with International Application No. PCT/KR2021/005087, 15 pages.

(Continued)

*Primary Examiner* — Joel Ajayi

(57) ABSTRACT

Provided are a method and apparatus for reporting a mobility state in a mobile communication system. A method of reporting a mobility state of a terminal in a mobile communication system includes triggering a radio resource control (RRC) connection re-establishment procedure in an RRC connected mode, determining a mobility state in the RRC connected mode, selecting a suitable cell by performing cell selection, transmitting an RRC reestablishment request message (RRC Reestablishment Request) to the selected suitable cell, and when receiving an RRC connection setup message (RRC setup) in response to the RRC connection reestablishment request from the suitable cell, including the mobility state in an RRC connection reestablishment complete message and transmitting the RRC connection reestablishment complete message to the suitable cell.

10 Claims, 15 Drawing Sheets

(58) Field of Classification Search
USPC .......................................................... 455/440
See application file for complete search history.

(56) References Cited

U.S. PATENT DOCUMENTS

| | | | |
|---|---|---|---|
| 2016/0183314 A1 | 6/2016 | Tsuboi et al. | |
| 2016/0374073 A1* | 12/2016 | Oh | H04W 72/21 |
| 2018/0249361 A1* | 8/2018 | Otsuki | H04W 4/70 |
| 2019/0045575 A1 | 2/2019 | Huang et al. | |
| 2019/0053324 A1* | 2/2019 | Tseng | H04W 76/30 |
| 2019/0215887 A1 | 7/2019 | Burbidge et al. | |

OTHER PUBLICATIONS

Ericsson, "[E002] On mobilityState reporting," R2-2003076, 3GPP TSG-RAN2 Meeting #109e-bis, Electronic meeting, Apr. 9, 2020, 7 pages.

Ericsson, "[E055, E057, E058] Missing initiation activation actions in NR V2X RRC procedure," R2-2003209, 3GPP TSG-RAN WG2 Meeting #109bis-e, Electronic Meeting, Apr. 13, 2020, 818 pages.

Huawei, et al., "Introduction of 5G V2X with NR sidelink," R2-2001966, 3GPP TSG-RAN WG2 Meeting #109e, Electronic Meeting, Mar. 11, 2020, 491 pages.

Intel Corporation, "Introduction of NR mobility enhancement, " R2-2001767, 3GPP TSG-RAN WG2 Meeting #109, Electronic Meeting, Mar. 11, 2020, 524 pages.

Supplementary European Search Report dated Jun. 20, 2023, in connection with European Patent Application No. 21791638.6, 9 pages.

Ericsson, "Open issues associated of MDT," R2-2003074, 3GPP TSG-RAN WG2 #109e-bis, Electronic meeting, Apr. 20-30, 2020, 10 pages.

Huawei et al., "CR for introducing MDT and SON," R2-2001999, 3GPP TSG-RAN WG2 Meeting #109-e, Electronic meeting, Feb. 24-Mar. 6, 2020, 573 pages.

Samsung, "[S953] Mobility state reporting in RRC connection reestablishment," R2-2004884, 3GPP TSG-RAN WG2 Meeting #110 electronic, Online, Jun. 1-12, 2020, 3 pages.

Notification of the First Office Action dated Mar. 31, 2025, in connection to Chinese Application No. 202180030411.3, 14 pages.

Office Action dated Aug. 22, 2025, in connection with Korean Application No. 10-2020-0048869, 9 pages.

Office Action dated Aug. 28, 2025, in connection with Chinese Application No. 202180030411.3, 13 pages.

Communication Pursuant to Article 94(3) EPC dated Sep. 26, 2025, in connection with European Application No. 21791638.6, 9 pages.

* cited by examiner

METHOD AND DEVICE FOR REPORTING MOBILITY STATE IN MOBILE COMMUNICATION SYSTEM

CROSS-REFERENCE TO RELATED APPLICATIONS

This application is a 371 National Stage of International Application No. PCT/KR2021/005087, filed Apr. 22, 2021, which claims priority to Korean Patent Application No. 10-2020-0048869, filed Apr. 22, 2020, the disclosures of which are herein incorporated by reference in their entirety.

BACKGROUND

1. Field

The disclosure relates to a method and apparatus for reporting a mobility state in a mobile communication system.

2. Description of Related Art

To meet the increase in demand with respect to wireless data traffic after the commercialization of 4G communication systems, considerable efforts have been made to develop pre-5G communication systems or 5G communication systems. This is one reason why '5G communication systems' or 'pre-5G communication systems' are called 'beyond 4G network communication systems' or 'post Long-Term Evolution (LTE) systems.'

In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (massive MIMO), full dimensional MIMO (FD-MIMO), array antennas, analog beamforming, and large-scale antennas.

In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied.

In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, due to the development of wireless communication systems, there is a need for a method and apparatus for reporting a mobility state in a mobile communication system.

SUMMARY

According to the disclosure, a method and apparatus for reporting a mobility state in a mobile communication system are provided.

According to an embodiment of the disclosure, a method and apparatus for reporting a mobility state in a mobile communication system may be provided.

DETAILED DESCRIPTION

Figure 1A:
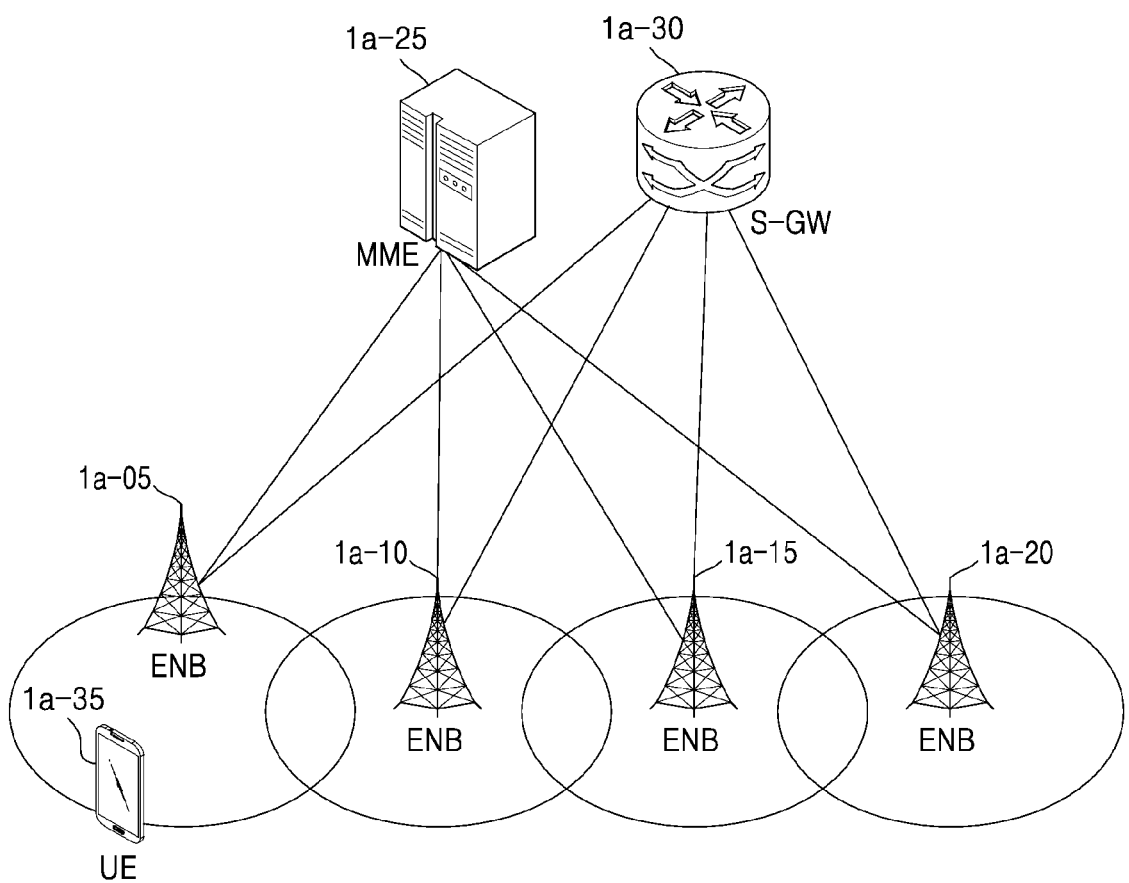
FIG. 1A illustrates a structure of an LTE system.

A method of reporting a mobility state of a terminal in a mobile communication system may include triggering a radio resource control (RRC) connection re-establishment procedure in an RRC connected mode, determining a mobility state in the RRC connected mode, selecting a suitable cell by performing cell selection, transmitting an RRC reestablishment request message (RRC Reestablishment Request) to the selected suitable cell, and when receiving an RRC connection setup message (RRC setup) in response to the RRC connection reestablishment request from the suitable cell, including the mobility state in an RRC connection reestablishment complete message and transmitting the RRC connection reestablishment complete message to the suitable cell.

Hereinafter, embodiments of the disclosure will be described in detail with reference to accompanying drawings. In describing the embodiments, descriptions of technical details that are well known in the art to which the disclosure pertains and are not directly related to the disclosure will be omitted. This is to clearly convey the gist of the disclosure by omitting unnecessary description.

For the same reason, some components in the accompanying drawings are exaggerated, omitted, or schematically illustrated. In addition, the size of each component does not fully reflect the actual size. Like reference numerals are assigned to like or corresponding components in each drawing.

The advantages and features of the disclosure and methods of achieving the advantages and features will be described more fully with reference to the accompanying drawings, in which embodiments to be described below are shown. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the disclosure to those skilled in the art. The scope of the disclosure is only defined in the claims. Throughout the specification, like reference numerals indicate like components.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or '~ er(or)' used herein denotes a software element or a hardware element such as a field-programmable gate array (FPGA) or an application-specific integrated circuit (ASIC), and performs a certain function. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card. Also, 'units' or '~ers(ors)' may include at least one processor.

While describing the disclosure below, detailed description of related well-known functions or configurations may be omitted when it is deemed that they may unnecessarily obscure the essence of the disclosure. Hereinafter, embodiments of the disclosure will be described with reference to accompanying drawings.

In the following description, the term for identifying an access node, the term referring to a network entity, the term referring to messages, the term referring to an interface between network objects, and the term referring to various identification information, and the like are examples provided for convenience of description. However, the disclosure is not limited by the following terms, and other terms having equivalent technical meanings may be used.

Hereinafter, for convenience of description, in the disclosure, the terms and names defined in the 3rd Generation Partnership Project Long Term Evolution (3GPP LTE) specification are used. However, the disclosure is not limited by the terms and names, but may also be applied to systems complying with other specifications. In the disclosure, 'eNB' may be interchangeably used with 'gNB' for convenience of description. That is, a base station described as an 'eNB' may denote a 'gNB'. Also, the term 'terminal' may indicate not only mobile phones, NB-IoT devices, or sensors but also other wireless communication devices.

Hereinafter, a base station is an entity that assigns resources of a terminal, and may be at least one of a gNode B, an eNode B, a Node B, a base station (BS), a radio access unit, a base station controller, or a node on a network. Examples of a terminal may include user equipment (UE), a mobile station (MS), a cellular phone, a smartphone, a computer, and a multimedia system capable of performing a communication function. However, the terminal is not limited to the above examples.

In particular, the disclosure may be applied to a 3GPP NR (5th Generation mobile communication standards). In addition, based on 5G communication technology and IoT-related technology, the disclosure may be applied to intelligent services (e.g., smart home, smart building, smart city, smart car or connected car, healthcare, digital education, retail business, security and safety related services, etc.). In the disclosure, 'eNB' may be interchangeably used with 'gNB' for convenience of description. That is, a base station described as an 'eNB' may denote a 'gNB'. Also, the term 'terminal' may indicate not only mobile phones, NB-IoT devices, or sensors but also other wireless communication devices.

In regard to wireless communication systems, progress is underway from just providing voice-based services in the initial stage to broadband wireless communication systems for providing high-rate and high-quality packet data services such as communication standards including HSPA (High Speed Packet Access) of 3GPP, LTE (Long Term Evolution or E-UTRA (Evolved Universal Terrestrial Radio Access)), LTE-Advanced (LTE-A), LTE-Pro, HRPD (High Rate Packet Data) of 3GPP2, UMB (Ultra Mobile Broadband), and 802.16e of IEEE.

Examples of the broadband wireless communication systems include, in an LTE system, an OFDM (Orthogonal Frequency Division Multiplexing) in a downlink (DL) and SC-FDMA (Single Carrier Frequency Division Multiple Access) method in an uplink (UL). An uplink refers to a radio link through which a terminal (UE; User Equipment or MS; Mobile Station) transmits data or a control signal to a base station (eNode B or BS; Base Station), and a downlink refers to a radio link through which a base station transmits data or a control signal to a terminal.

In addition, while embodiments of the disclosure are described below by taking an LTE, LTE-A, LTE Pro or 5G (or NR, next-generation mobile communication) system as an example, the embodiments of the disclosure may also apply to other communication systems having a similar technical background or channel type. In addition, the embodiments of the disclosure may be applied to other communication systems through some modifications without largely departing from the scope of the disclosure, according to judgment by one of ordinary skill in the art.

FIG. 1A illustrates a structure of an LTE system.

Referring to FIG. 1A, a radio access network of the LTE system may consist of a plurality of base stations (Evolved Node B (hereinafter, 'ENB', a 'Node B,' or a 'base station')) 1a-05, 1a-10, 1a-15, and 1a-20, a mobility management entity (MME) 1a-25, and a Serving-Gateway (S-GW) 1a-30. A user equipment (hereinafter 'UE' or 'terminal') 1a-35 may access an external network via the ENBs 1a-05, 1a-10, 1a-15, 1a-20 and the S-GW 1a-30.

Base stations (Evolved Node B, hereinafter, 'eNB,' 'Node B' or 'base station') 1a-05, 1a-10, 1a-15, 1a-20 are access nodes of a cellular network and provide wireless access to terminals accessing the network. That is, the base stations 1a-05, 1a-10, 1a-15, and 1a-20 collect state information such as a buffer state, an available transmission power state, and a channel state of terminals to service users' traffic and schedule the state information to thereby support connection between the terminals and a core network (CN).

Also, the base stations 1a-05, 1a-10, 1a-15, 1a-20 may correspond to an existing node B of the Universal Mobile Telecommunication System (UMTS). The ENBs 1a-05, 1a-10, 1a-15, 1a-20 are connected to the UE 1a-35 via a radio channel and may perform a more complicated function than the existing node B. In an LTE system, all user traffic including real-time services such as Voice over IP (VoIP) through an internet protocol is serviced through a shared channel, and thus, an apparatus for collecting state information such as buffer state, available transmission power state, channel state of UEs and scheduling the state information is required, and the ENBs 1a-05, 1a-10, 1a-15, 1a-20 assume this function. One ENB may typically control multiple cells. In an LTE system, to realize a transmission rate of 100 Mbps, for example, Orthogonal Frequency Division Multiplexing (hereinafter, 'OFDM') may be used at a bandwidth of, for example, 20 MHz, as a radio access technology. In addition, the Adaptive Modulation & Coding (hereinafter, 'AMC') scheme that determines a modulation scheme and a channel coding rate according to a channel state of a terminal is applied.

The MME 1a-25 is a device that assumes not only a mobility management function regarding a terminal but also various control functions, and is connected to a plurality of base stations. The S-GW 1a-30 is a device providing a data bearer. The MME 1a-25 and the S-GW 1a-30 may perform, for example, authentication on a terminal accessing a network, bearer management, or the like, and processes a packet arrived from the base stations 1a-05, 1a-10, 1a-15, 1a-20 or a packet to be transmitted to the base stations 1a-05, 1a-10, 1a-15, 1a-20.

Figure 1B:
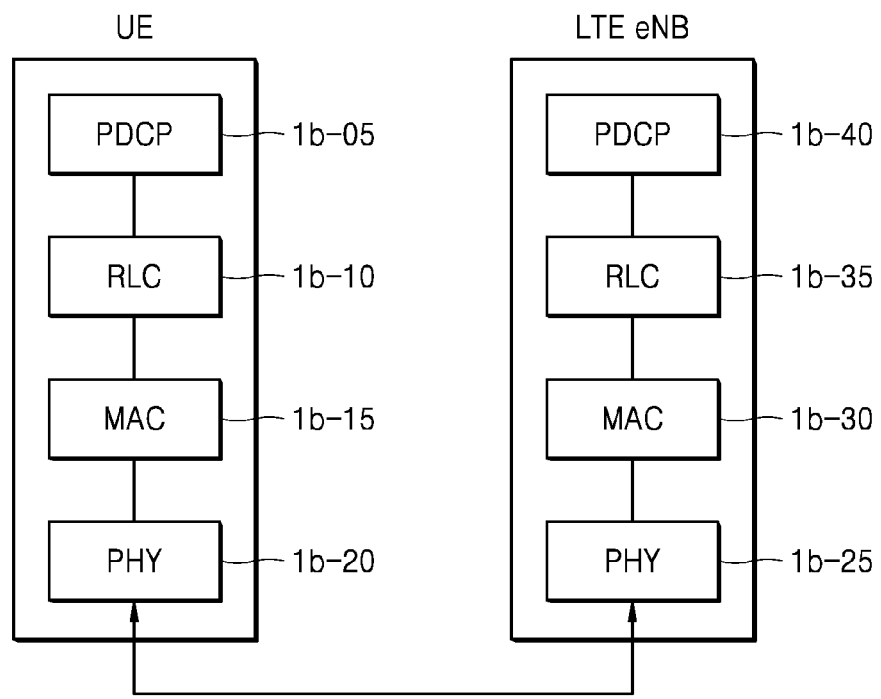
FIG. 1B illustrates a wireless protocol structure in an LTE system.

FIG. 1B illustrates a wireless protocol structure in an LTE system.

Referring to FIG. 1B, the wireless protocol of the LTE system consists of, in each of a terminal and an ENB, a PDCP (Packet Data Convergence Protocol) 1b-05, 1b-40, RLC (Radio Link Control) 1b-10, 1b-35, and MAC (Medium Access Control) 1b-15, 1b-30. The PDCP (Packet Data Convergence Protocol) 1b-05, 1b-40 takes charge of an operation such as IP header compression/reconfiguration. Major functions of the PDCP are summarized as below.

Header compression and decompression: ROHC only
    Transfer of user data
    In-sequence delivery of upper layer PDUs at PDCP re-establishment procedure for RLC AM
    For split bearers in DC (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The Radio Link Control (hereinafter, 'RLC') 1b-10 or 1b-35 may reconfigure a PDCP PDU (Packet Data Unit) in an appropriate size and perform an ARQ operation or the like. The major functions of an RLC are summarized as below.

Transfer of upper layer PDUs
ARQ (Error Correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 1b-15 or 1b-30 is connected to several RLC layer entities configured in one terminal, and performs an operation of multiplexing RLC PDUs to MAC PDUs and demultiplexing RLC PDUs from MAC PDUs. The major functions of a MAC are summarized as below.

Mapping between logical channels and transport channels
Multiplexing/demultiplexing of MAC SDUs belonging to one or different logical channels into/from transport blocks (TB) delivered to/from the physical layer on transport channel s
Scheduling information reporting
Hybrid ARQ (HARQ) (Error correction through HARQ)
Priority handling between logical channels of one UE
Priority handling between UEs by means of dynamic scheduling
MBMS service identification
Transport format selection
Padding A PHY layer 1b-20, 1b-25 performs channel coding and modulation on upper layer data and converts the same into an OFDM symbol and transmits the OFDM symbol to a radio channel, or demodulates an OFDM symbol received via a radio channel and performs channel decoding on the demodulated OFDM symbol and transfers the channel-decoded OFDM symbol to an upper layer.

Although not illustrated in FIG. 1B, there is a Radio Resource Control (RRC) layer above a PDCP layer of each of a terminal and a base station, and the RRC layer may transmit or receive a access-related or measurement-related setting control message for radio resource control.

Figure 1C:
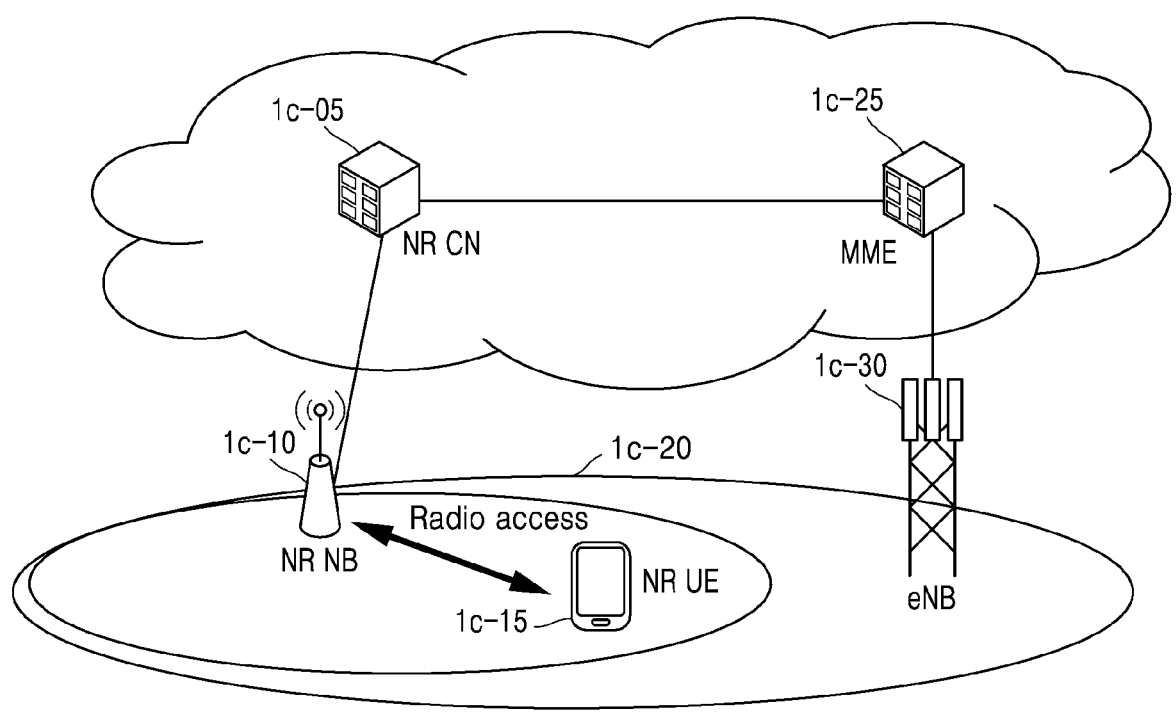
FIG. 1C illustrates a structure of a next-generation mobile communication system.

FIG. 1C illustrates a structure of a next-generation mobile communication system.

Referring to FIG. 1C, a radio access network of the next-generation mobile communication system (5G or NR system) consists of a next-generation base station (New Radio Node B, hereinafter 'NR gNB' or 'NR base station') 1c-10 and an NR CN 1c-05 (New Radio Core Network, or NG CN: Next Generation Core Network). A New Radio user equipment (hereinafter 'NR UE' or 'terminal') 1c-15 accesses an external network via the NR gNB 1c-10 and the NR CN 1c-05.

In FIG. 1C, the NR gNB 1c-10 corresponds to an Evolved Node B (eNB) of an LTE system. The NR gNB (i.e. NR NB 1c-10) is connected to the NR UE 1c-15 via a radio channel and may provide significantly better services than the node B. In the next-generation mobile communication system, as all user traffic is serviced through a shared channel, a device that collects state information such as buffer state, available transmission power state, and channel state of UEs and schedules the state information is required, and NR NB 1c-10 takes charge of this function. One NR gNB typically controls multiple cells. The next-generation mobile communication system (5G or NR system) may have a maximum bandwidth equal to or more than an existing maximum bandwidth in order to implement ultra-high-speed data transmission compared to the LTE system, and beamforming technology may be additionally applied thereto by using Orthogonal Frequency Division Multiplexing (hereinafter 'OFDM') as a radio access technology. In addition, the Adaptive Modulation & Coding (hereinafter 'AMC') scheme that determines a modulation scheme and a channel coding rate according to a channel state of a terminal may be applied. The NR CN 1c-05 may perform functions such as mobility support, bearer configuration, or QoS configuration. The NR CN 1c-05 is a device that assumes not only a mobility management function regarding a terminal but also various control functions, and is connected to a plurality of base stations. Also, the next-generation mobile communication system (5G or NR system) may also be linked to the LTE system, and the NR CN 1c-05 may be connected to an MME 1c-25 via a network interface. The MME 1c-25 is connected to the eNB 1c-30 which is an existing base station.

Figure 1D:
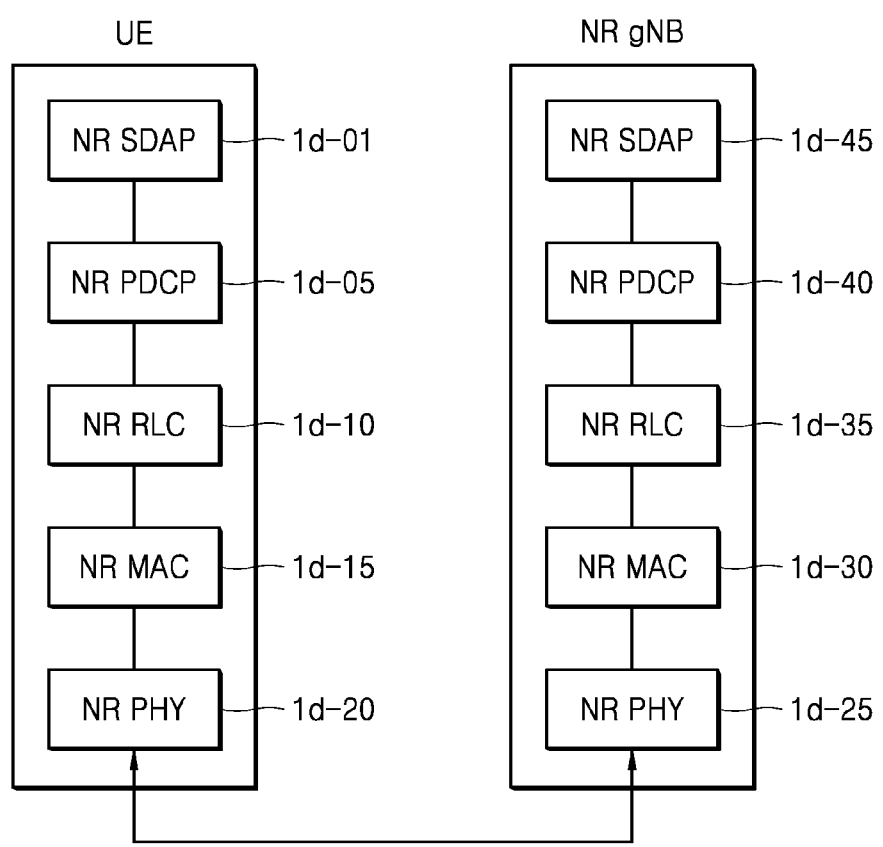
FIG. 1D illustrates a wireless protocol structure of a next-generation mobile communication system.

FIG. 1D illustrates a wireless protocol structure of a next-generation mobile communication system.

FIG. 1D is a diagram illustrating a wireless protocol structure of a next-generation mobile communication system to which the disclosure may be applied.

Referring to FIG. 1D, a wireless protocol of the next-generation mobile system (5G or NR system) consists of, in each of a terminal and an NR base station, NR SDAP 1d-01, 1d-45, NR PDCP 1d-05, 1d-40, NR RLC 1d-10, 1d-35, and NR MAC 1d-15, 1d-30.

The major functions of the NR SDAP 1d-01, 1d-45 may include some of functions below.

Transfer of user plane data
mapping between a QoS flow and a DRB for both DL and uplink UL
marking QoS flow ID in both DL and UL packets
mapping reflective QoS flow to DRB for UL SDAP PDUs With respect to an SDAP layer entity, a terminal may receive, via an RRC message, configuration as to whether a header of the SDAP layer entity is to be used or a function of the SDAP layer entity is to be used for each PDCP layer entity or each bearer or each logical channel. When the SDAP header is configured, a 1-bit NAS reflective QoS configuration indicator and a 1-bit AS reflective QoS configuration indicator of the SDAP header may indicate the UE to update or reconfigure mapping information between a QoS flow and a data bearer for UL and DL. The SDAP header may include QoS flow ID information indicating a QoS. QoS information may be used as data processing priority, scheduling information, or the like, to support proper provision of services.

The major functions of the NR PDCP 1d-05 or 1d-40 may include some of functions below.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP entity may indicate a function of reordering PDCP PDUs received from a lower layer in order based on PDCP SN (sequence number), and may include a function of transferring data to an upper layer in a reordered order or include a function of directly transferring the same without considering the order, include a function of recording lost PDCP PDUs by reordering the order, include a function of reporting a state of the lost PDCP PDUs to a transmitting side, and include a function of requesting retransmission of the lost PDCP PDUs.

The major functions of the NR RLC 1d-10, 1d-35 may include some of functions below.

Transfer of upper layer PDUs
In-sequence delivery of upper layer PDUs
Out-of-sequence delivery of upper layer PDUs
ARQ (Error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment Here, an in-sequence delivery function of an NR RLC entity may indicate a function of transferring RLC SDUs received from a lower layer to an upper layer in order. In detail, when an originally single RLC SDU is divided into multiple RLC SDUs and received, the in-sequence delivery function of the NR RLC entity may include a function of reassembling received RLC SDUs and transferring the same, a function of reordering received RLC PDUs based on RLC SN (sequence number) or PDCP SN (sequence number), a function of recording lost RLC PDUs by reordering the order, a function of reporting a state of the lost RLC PDUs to a transmitting side, a function of, when there is a lost RLC SDU, transferring only RLC SDUs before the lost RLC SDU, to an upper layer in order, or when a certain timer has expired even when there is a lost RLC SDU, a function of transferring all RLC SDUs received before a start of the timer, to an upper layer in order, or when a certain timer has expired even when there is a lost RLC SDU, a function of transferring all RLC SDUs received up to present, to an upper layer in order.

Here, RLC PDUs may also be processed and transferred to the PDCP entity in an order in which they are received, regardless of an order (out-of sequence delivery) (regardless of serial numbers, an order of sequence numbers, but in an order in which they arrive), and when a segment is received, the NR RLC may receive segments that are stored in a buffer or are to be received later and reconfigure the segments into a complete, single RLC PDU and process the RLC PDU and transfer the same to a PDCP entity. The NR RLC layer may not include a concatenation function, and may perform the above-described functions in an NR MAC layer or replace the concatenation function with a multiplexing function of an NR MAC layer.

The out-of-sequence delivery function of the NR RLC entity refers to a function of directly transferring RLC SDUs received from a lower layer to an upper layer regardless of an order, and when an originally single RLC SDU is divided into multiple RLC SDUs and received, the NR RLC entity may include a function of reassembling and transferring the RLC SDUs, and include a function of storing RLC SNs or PDCP SNs of received RLC PDUs and reordering the RLC PDUs and recording lost RLC PDUs.

The NR MAC 1d-15, 1d-30 may be connected to multiple NR RLC layer entities configured in one terminal, and the major functions of the NR MAC may include some of functions below.

Mapping between logical channels and transport channels
Multiplexing/demultiplexing of MAC SDUs
Scheduling information reporting
HARQ (Error correction through HARQ)
Priority handling between logical channels of one UE
Priority handling between UEs by means of dynamic scheduling
MBMS service identification
Transport format selection
Padding An NR PHY layer 1d-20, 1d-25 may perform channel coding or modulation on upper layer data and convert the same into an OFDM symbol and transmit the OFDM symbol to a radio channel, or demodulate an OFDM symbol received via a radio channel and perform channel decoding on the demodulated OFDM symbol and transfer the channel-decoded OFDM symbol to an upper layer.

Figure 1E:
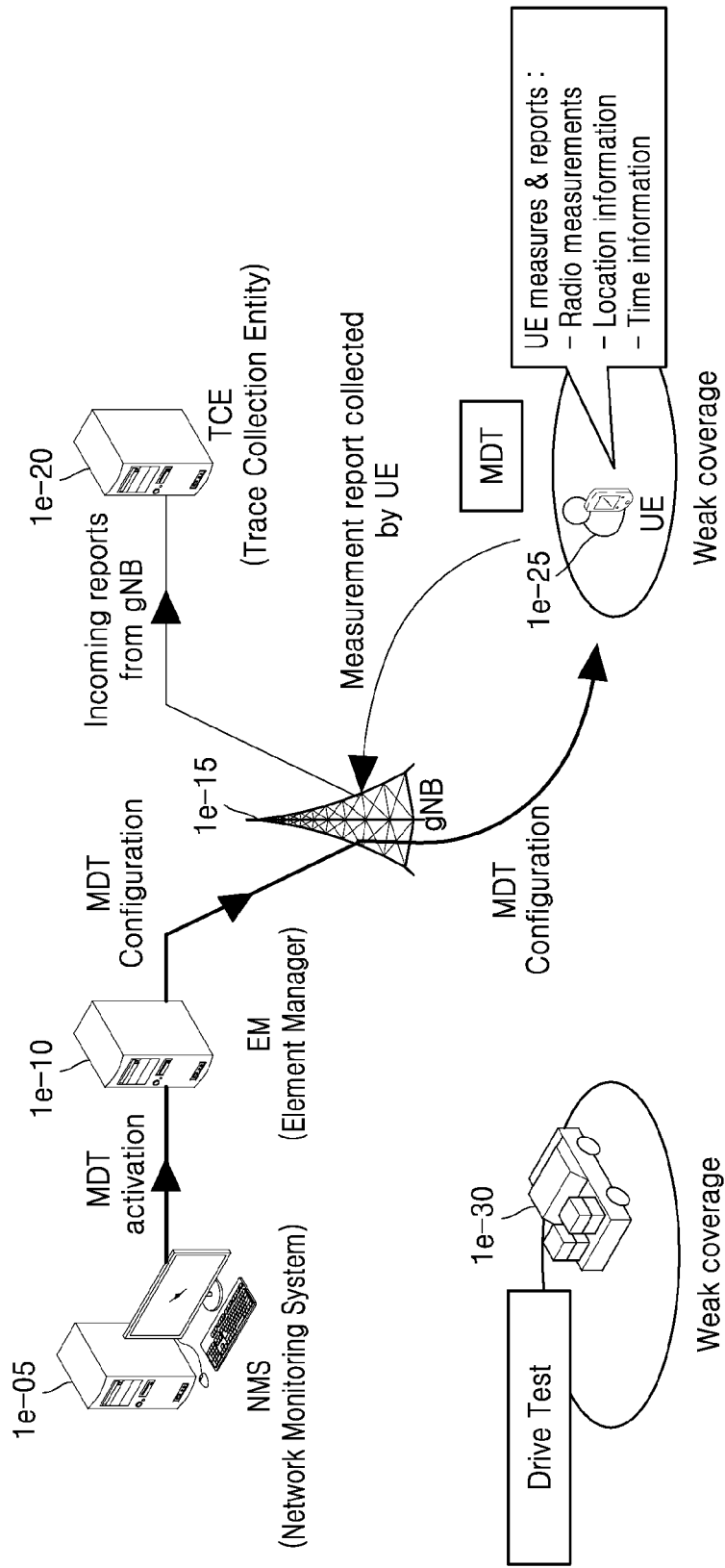
FIG. 1E is a diagram for describing a technique of collecting and reporting cell measurement information according to an embodiment of the disclosure.

FIG. 1E is a diagram for describing a technique of collecting and reporting cell measurement information according to an embodiment of the disclosure.

When establishing or optimizing a network, a mobile virtual network operator (MVNO) may typically measure a signal intensity in an expected service area and perform a process of allocating or readjusting base stations in the service area based on the measured signal intensity. The MVNO loads signal measurement equipment on a vehicle and collects cell measurement information in a typical, predicted service area, which requires a lot of time and cost. The process of collecting cell measurement information described above typically uses a vehicle, and is commonly called a Drive Test 1e-30.

The terminal 1e-25 has a function of measuring a signal and transmitting a measurement result to a base station to support operations such as cell reselection or handover during a transfer between cells, or addition of a serving cell, or the like. Thus, instead of a Drive Test, the terminal 1e-25 in the service area may be used, and this may be defined as MDT (Minimization of Drive Test). An MVNO may set an MDT operation in certain terminals by using various configuration devices of a network. Also, terminals may collect and store signal intensity information from a serving cell or peripheral cells in an RRC connected mode (RRC_CONNECTED), an RRC idle mode (RRC_IDLE), or an RRC inactive mode (RRC_INACTIVE). Furthermore, the terminals may also store various information such as position information, time information or signal quality information. Information that a terminal may store is not limited to the above examples. Information stored in a terminal as described above may be reported to a network when the terminals are in a connected mode, and the information may be transmitted to a certain server.

The above-described MDT operation may be largely classified into Immediate MDT and Logged MDT.

Immediate MDT is characterized by immediately reporting collected information to a network. As the terminal has to directly report collected information to a network, only a terminal in an RRC connected mode may perform it. For example, Immediate MDT may be performed by reutilizing an RRM (Radio Resource Management) measurement process for supporting an operation such as a handover or addition of a serving cell, and position information, time information, or the like may be further reported to a network.

Logged MDT is characterized in that collected information is not immediately reported to a network but a terminal stores the information, and after the terminal is converted into an RRC connected mode, the terminal reports the stored information. For example, a terminal that is in an RRC idle mode or an RRC inactive mode and thus not able to immediately report collected information may perform Logged MDT. According to an embodiment of the disclosure, a terminal in an RRC inactive mode, which is introduced in a next-generation mobile communication system, is characterized by performing Logged MDT. When a certain terminal is in an RRC connected mode, a network may provide configuration information for performing a Logged MDT operation to the terminal in a connected mode. Also, after a terminal is converted into an RRC idle mode or an RRC inactive mode, the terminal may collect and store configured information.

Table 1 below includes MDT modes (Immediate MDT or Logged MDT) that a terminal may perform according to an RRC state of the terminal.

TABLE 1

| MDT | RRC state |
| --- | --- |
| Immediate MDT | RRC_Connected |
| Logged MDT | RRC_Idle, RRC_Inactive |

Figure 1F:
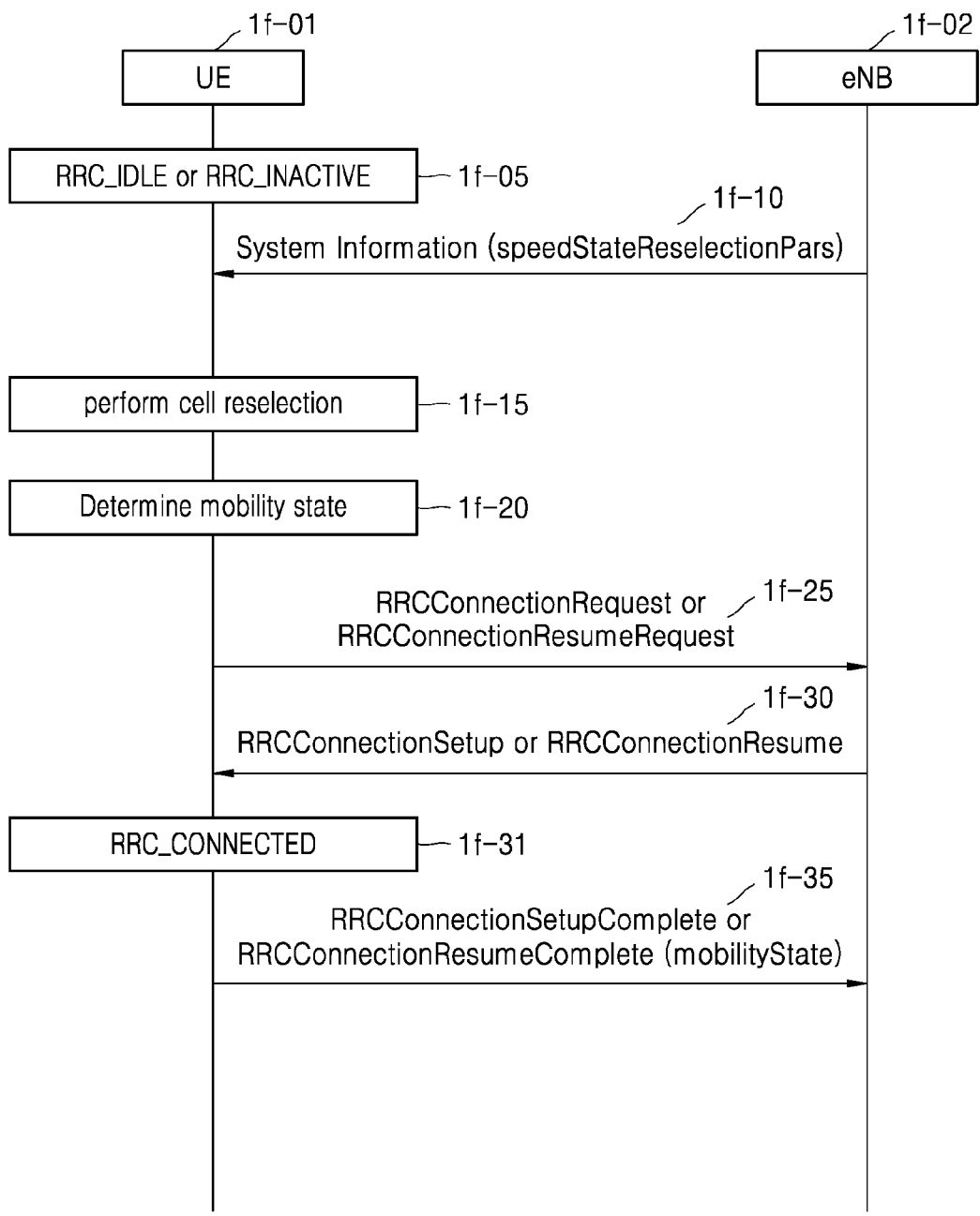
FIG. 1F is a flowchart of a process whereby a terminal reports a mobility state to an LTE base station in an LTE system, according to an embodiment of the disclosure.

FIG. 1F is a flowchart of a process whereby a terminal reports a mobility state to an LTE base station in an LTE system, according to an embodiment of the disclosure.

According to an embodiment, a terminal in an LTE system may determine a mobility state in an RRC idle mode or an RRC inactive mode and report the mobility state to an LTE base station. While maintaining an RRC connected mode, the terminal may determine a mobility state but not report to an LTE base station.

Referring to FIG. 1F, in operation 1f-05, a terminal 1f-01 may be in an RRC idle mode (RRC_IDLE) or an RRC inactive mode (RRC_INACTIVE).

In operation 1f-10, the terminal 1f-01 in the RRC idle mode or the RRC inactive mode may receive or obtain system information from a base station 1f-02. The system information may include information for the terminal 1f-01 to perform a cell selection or cell reselection process. In an embodiment, the system information may include parameters for determining a mobility state of the terminal 1f-01 (speedStateReselectionPars). The parameters for determining a mobility state of the terminal 1f-01 (speedStateReselectionPars) may include information (or parameters) as below.

- t-Evaluation: a duration value indicating evaluating criteria used to enter a mobility state (The duration of evaluating criteria to enter mobility states). For example, one of values such as 30 seconds, 60 seconds, 120 seconds, 180 seconds, and 240 seconds may be signaled.
- t-Evaluation may indicate $T_{CRmax}$, and this may indicate a duration used to determine a number of times of allowable cell reselection (This specifies the duration for evaluating allowed amount of cell reselection(s)).
- t-HystNormal: an additional duration value indicating evaluating criteria used to enter a normal mobility state (The additional duration for evaluating criteria to enter normal mobility state). For example, one of values such as 30 seconds, 60 seconds, 120 seconds, 180 seconds, and 240 seconds may be signaled.
- t-HystNormal may indicate $T_{CRmaxHyst}$, and this may indicate an additional period value before a terminal enters a normal mobility state (This specifies the additional time period before the UE can enter Normal mobility state).
- n-CellChangeMedium: a value of a number of times of cell changes for entering a medium mobility state (The number of cell changes to enter medium mobility state). For example, one of integer values of 1 to 16 may be signaled.
- n-CellChangeMedium may indicate $N_{CR\_M}$, and this may indicate a maximum number of times of cell reselection for entering a medium mobility state (This specifies the maximum number of cell reselections to enter Medium mobility state).
- n-CellChangeHigh: a value of a number of times of cell changes for entering a high mobility state (The number of cell changes to enter high mobility state). For example, one of integer values of 1 to 16 may be signaled, and a value greater than n-CellChangeMedium may be signaled.
- n-CellChangeHigh may indicate $N_{CR\_H}$, and this may indicate a maximum number of times of cell reselection for entering a high mobility state (This specifies the maximum number of cell reselections to enter High mobility state).
- q-HystSF: speed-based ScalingFatcor parameter
- sf-Medium: an additional hysteresis parameter value used in a medium mobility state. For example, one of values of −6 dB, −4 dB, −2 dB, and 0 dB may be signaled.
- sf-High: an additional hysteresis parameter value used in a high mobility state. For example, one of values of −6 dB, −4 dB, −2 dB, and 0 dB may be signaled.

In operation 1f-15, the terminal 1f-01 in the RRC idle mode or the RRC inactive mode may perform a cell selection or cell reselection process.

In operation 1f-20, the terminal 1f-01 in the RRC idle mode or the RRC inactive mode may determine a mobility state. The terminal 1f-01 may determine a mobility state based on following certain conditions.

Medium mobility state conditions (Medium mobility state criteria)
When a number of times of cell reselection during $T_{CRmax}$ exceeds $N_{CR\_M}$ and does not exceed $N_{CR\_H}$ (If number of cell reselections during time period $T_{CRmax}$ exceeds $N_{CR\_M}$ and not exceeds $N_{CR\_H}$)

High mobility state conditions (High mobility state criteria)
When a number of times of cell reselection during $T_{CRmax}$ exceeds $N_{CR\_H}$ (If number of cell reselections during time period $T_{CRmax}$ exceeds $N_{CR\_H}$)

Normal mobility state criteria (Normal mobility state criteria)
When medium mobility state conditions or high mobility state conditions are not met during $T_{CRmax}$ (criteria for either Medium or High mobility state is not detected during time period $T_{CRmaxHyst}$)

In operation 1f-25, the terminal 1f-01 in the RRC idle mode or the RRC inactive mode may initiate an RRC connection establishment procedure or an RRC connection resume procedure to establish an RRC connection to the base station 1f-02. That is, in operation 1f-25, the terminal 1f-01 may transmit, to the base station 1f-02, an RRC connection request message (RRCConnectionRequest) or an RRC connection resume request message (RRCConnectionResumeRequest).

In operation 1f-30, the base station 1f-02 may transmit, to the terminal 1f-01, in response to the RRC connection request message or the RRC connection resume request message, an RRC connection setup message (RRCConnectionSetup) or an RRC connection resume message (RRCConnectionResume).

In operation 1f-31, the terminal 1f-01 that has received the RRC connection setup message or the RRC connection resume message may be shifted to the RRC connected mode (RRC_CONNECTED).

In operation 1f-35, the terminal 1f-01 in the RRC connected mode may transmit, to the base station 1f-02, an RRC connection setup complete message (RRCConnectionSetupComplete) or an RRC connection resume complete message (RRCConnectionResumeComplete). The RRC connection setup complete message or the RRC connection resume complete message may include a mobility state of the terminal 1f-01. For example, in the RRC connection setup complete message or the RRC connection resume complete message, a parameter indicating a mobility state of the terminal 1f-01, mobilityState, may be included. In detail, a mobility state immediately before the terminal 1f-01 is shifted to the RRC connected mode (RRC_CONNECTED) may be included in the RRC connection setup complete message or the RRC connection resume complete message. For example, the terminal 1f-01 may configure mobilityState, which is a parameter indicating a mobility state of the terminal 1f-01, as a mobility state of the terminal 1f-01 immediately before being shifted to the RRC connected mode (RRC_CONNECTED), and include the parameter in the RRC connection setup complete message or the RRC connection resume complete message. (include the mobilityState and set it to the mobility state (as specified in TS 36.304) of the UE just prior to entering RRC_CONNECTED state).

Figure 1G:
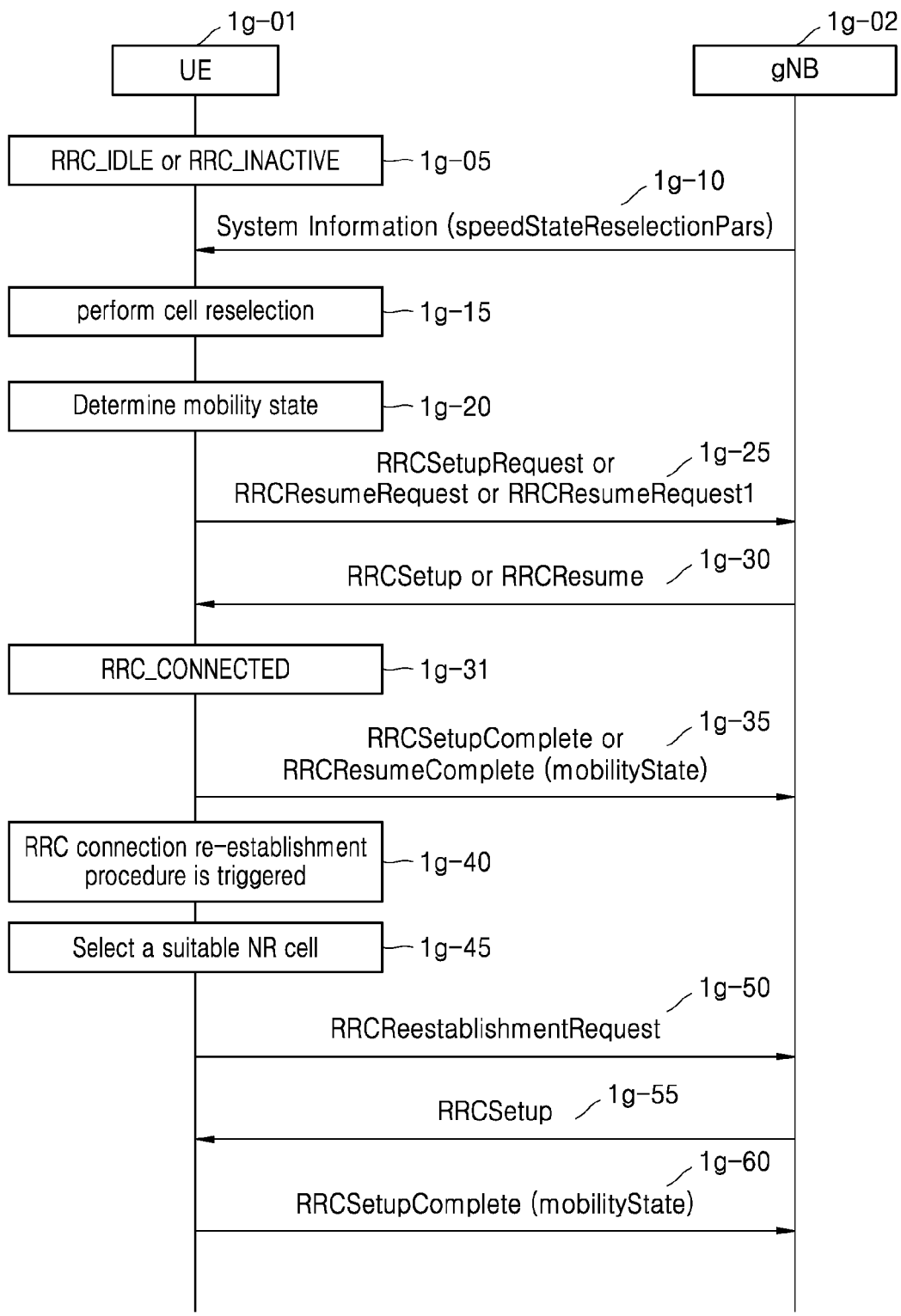
FIG. 1G is a flowchart of a process whereby a terminal reports a mobility state to an NR base station in an NR system, according to an embodiment of the disclosure.

FIG. 1G is a flowchart of a process whereby a terminal reports a mobility state to an NR base station in an NR system according to an embodiment of the disclosure.

A terminal in an NR system according to an embodiment of the disclosure may determine a mobility state in an RRC idle mode or an RRC inactive mode and report the mobility state to an NR base station. While maintaining the RRC connected mode, when the terminal receives, from a base station, an RRC connection setup message (RRCSetup) in response to the RRC connection reestablishment request message (RRCReestablishmentRequest), the terminal may include the mobility state determined in the RRC idle mode or the RRC inactive mode in the RRC connection setup complete message (RRCSetpupComplete) and report the same to an NR base station.

Referring to FIG. 1G, in operation 1g-10, a terminal 1g-01 may be in an RRC idle mode (RRC_IDLE) or an RRC inactive mode (RRC_INACTIVE).

In operation 1g-10, the terminal 1g-01 in the RRC idle mode or the RRC inactive mode may receive or obtain system information from a base station 1g-02. The system information may include information for the terminal 1g-01 to perform a cell selection or cell reselection process. In an embodiment, the system information may include parameters for determining a mobility state of the terminal 1g-01 (speedStateReselectionPars). The parameters for determining a mobility state of the terminal 1g-01 (speedStateReselectionPars) may include information (or parameters) as below.

t-Evaluation: a duration value indicating evaluating criteria used to enter a mobility state. (The duration of evaluating criteria to enter mobility states). For example, one of values such as 30 seconds, 60 seconds, 120 seconds, 180 seconds, and 240 seconds may be signaled.

t-Evaluation may indicate $T_{CRmax}$, and this may indicate a duration used to determine a number of times of allowable cell reselection (This specifies the duration for evaluating allowed amount of cell reselection(s)).

t-HystNormal: an additional duration value indicating evaluating criteria used to enter a normal mobility state (The additional duration for evaluating criteria to enter normal mobility state). For example, one of values such as 30 seconds, 60 seconds, 120 seconds, 180 seconds, and 240 seconds may be signaled.

t-HystNormal may indicate $T_{CRmaxHyst}$, and this may indicate an additional period value before a terminal enters a normal mobility state (This specifies the additional time period before the UE can enter Normal mobility state).

n-CellChangeMedium: a value of a number of times of cell changes for entering a medium mobility state (The number of cell changes to enter medium mobility state). For example, one of integer values of 1 to 16 may be signaled.

n-CellChangeMedium may indicate $N_{CR\_M}$, and this may indicate a maximum number of times of cell reselection for entering a medium mobility state (This specifies the maximum number of cell reselections to enter Medium mobility state).

n-CellChangeHigh: a value of a number of times of cell changes for entering a high mobility state (The number of cell changes to enter high mobility state). For example, one of integer values of 1 to 16 may be signaled, and a value greater than n-CellChangeMedium may be signaled.

n-CellChangeHigh may indicate $N_{CR\_H}$, and this may indicate a maximum number of times of cell reselection for entering a high mobility state (This specifies the maximum number of cell reselections to enter High mobility state).

q-HystSF: speed-based ScalingFactor parameter sf-Medium: an additional hysteresis parameter value used in a medium mobility state. For example, one of values of −6 dB, −4 dB, −2 dB, and 0 dB may be signaled.

sf-High: an additional hysteresis parameter value used in a high mobility state. For example, one of values of −6 dB, −4 dB, −2 dB, and 0 dB may be signaled.

In operation 1g-15, the terminal 1g-01 in the RRC idle mode or the RRC inactive mode may perform a cell selection or cell reselection process.

In operation 1g-20, the terminal 1g-01 in the RRC idle mode or the RRC inactive mode may determine a mobility state. The terminal 1g-01 may determine a mobility state based on following certain conditions.

Medium mobility state conditions (Medium mobility state criteria)

When a number of times of cell reselection during $T_{CRmax}$ is equal to or greater than $N_{CR\_M}$ and less than or equal to $N_{CR\_H}$ (If number of cell reselections during time period $T_{CRmax}$ is greater than or equal to $N_{CR\_M}$ but less than or equal to $N_{CR\_H}$)

High mobility state conditions (High mobility state criteria)

When a number of times of cell reselection during $T_{CRmax}$ exceeds $N_{CR\_H}$ (If number of cell reselections during time period $T_{CRmax}$ is greater than $N_{CR\_H}$)

Normal mobility state conditions (normal mobility state criteria)

When the medium mobility state conditions or the high mobility state conditions are not met during $T_{CRmax}$ (criteria for either Medium or High mobility state is not detected during time period $T_{CrmaxHyst}$) or when a number of times of cell reselection during $T_{CRmax}$ is less than $N_{CR\_M}$ (If number of cell reselections during time period $T_{CRmax}$ is less than $N_{CR\_M}$)

In operation 1g-25, the terminal 1g-01 in the RRC idle mode or the RRC inactive mode may initiate an RRC connection establishment procedure or an RRC connection resume procedure to establish an RRC connection to the base station 1g-02. That is, in operation 1g-25, the terminal 1g-01 may transmit, to the base station 1g-02, an RRC connection request message (RRCSetupRequest) or an RRC connection resume request message (RRCResumeRequest or RRCResumeRequest1).

In operation 1g-30, the base station 1g-02 may transmit, to the terminal 1g-01, the RRC connection setup message (RRC Setup) or an RRC connection resume message (RRCResume) in response to the RRC connection request message or the RRC connection resume request message.

In operation 1g-31, the terminal 1g-01 that has received the RRC connection setup message or the RRC connection resume message may be shifted to the RRC connected mode (RRC_CONNECTED).

In operation 1g-35, the terminal 1g-01 in the RRC connected mode may transmit, to the base station 1g-02, an RRC connection setup complete message (RRCSetupComplete) or an RRC connection resume complete message (RRCResumeComplete). The RRC connection setup complete message or the RRC connection resume complete message may include a mobility state of the terminal 1g-01. For example, in the RRC connection setup complete message or the RRC connection resume complete message, a parameter indicating a mobility state of the terminal 1g-01, mobilityState, may be included. In detail, a mobility state immediately before the terminal 1g-01 is shifted to the RRC connected mode (RRC_CONNECTED) may be included in the RRC connection setup complete message or the RRC connection resume complete message. For example, the terminal 1g-01 may configure mobilityState, which is a parameter indicating a mobility state of the terminal 1g-01, as a mobility state of the terminal 1g-01 immediately before being shifted to the RRC connected mode (RRC_CONNECTED), and include the parameter in the RRC connection setup complete message or the RRC connection resume complete message. (include the mobilityState and set it to the mobility state (as specified in TS 38.304) of the UE just prior to entering RRC_CONNECTED state).

In operation 1g-40, an RRC connection re-establishment procedure may be triggered according to following certain conditions. In an embodiment, the certain conditions may indicate at least one of the following.

When a timer T316 is not configured, and a radio link failure (RLF) has occurred with respect to Master Cell Group (MCG) (upon detecting radio link failure of the MCG and T316 is not configured)

When a re-configuration with sync failure has occurred with respect to MCG (upon re-configuration with sync failure of the MCG)

When Mobility from NR failure has occurred (upon mobility from NR failure)

When an RRC connection reconfiguration failure has occurred (upon an RRC connection reconfiguration failure)

Except for an integrity check failure with respect to an RRC connection reestablishment message (RRCReestablishment), when an integrity check failure is received from lower layers concerning SRB1 or SRB2 (upon integrity check failure from lower layers concerning SRB1 or SBI2, except if the integrity check failure is detected on the RRCReestablishment message)

In operation 1g-40, when the terminal 1g-01 in the RRC connected mode initiates an RRC connection reestablishment procedure, the terminal 1g-01 may perform operations below.

When a timer T310 is running, the timer T310 may be stopped.

When a timer T312 is running, the timer T312 may be stopped.

When a timer T304 is running, the timer T304 may be stopped.

A timer T311 may be started.

MAC layer entity may be reset (reset MAC).

A cell selection process may be performed. For example, the cell selection process may be performed based on the 3GPP standard document TS 38.304.

In operation 1g-45, the terminal 1g-01 in the RRC connected mode may select a suitable NR cell. When a suitable NR cell is selected, the terminal 1g-01 may stop the timer T311 that is running.—and start a timer T301.

In operation 1g-50, the terminal 1g-01 in the RRC connected mode may transmit, to the selected suitable NR cell, an RRC connection reestablishment request message (RRCReestablishmentRequest). Here, a suitable cell may be a cell to which the terminal is currently connected or may be a new cell.

In operation 1g-55, the NR base station 1g-02 that has received the RRC connection reestablishment request message may transmit an RRC connection setup message (RRCSetup) to the terminal 1g-01 in the RRC connected mode. According to an embodiment, when a terminal context of the terminal 1g-01 cannot be retrieved, the base station 1g-02 may transmit an RRC connection setup message to the terminal 1g-01 in the RRC connected mode.

In operation 1g-60, the terminal 1g-01 in the RRC connected mode may apply the received RRC connection setup message, and may transmit, as a response thereto, an RRC connection setup complete message (RRCSetupComplete) to the NR base station 1g-02. According to an embodiment of the disclosure, the terminal 1g-01 may include a mobility state determined (or derived) before the terminal 1g-01 is shifted to an RRC connected mode, in the RRC connection setup complete message (include the mobilityState in the RRCSetupComplete message and set it to the mobility state (as specified in TS 38.304) of the UE just prior to entering RRC_CONNECTED state). For example, the terminal 1g-01 in the RRC connected mode may accommodate a mobility state determined or derived in operation 1g-20, in an RRC connection setup complete message in operation 1g-60 and transmit the RRC connection setup complete (or RRC setup complete) message.

A terminal in the RRC connected mode according to an embodiment of the disclosure may have problems as follows:

Problem 1: it has to continuously store a mobility state reported in operation 1g-35 after being shifted to the RRC connected mode. This is disadvantageous in that the mobility state of the terminal reported to a base station has to be maintained unnecessarily continuously.

Problem 2: the mobility state reported in operation 1g-35 may be different from the mobility state of the terminal in operation 1g-60. That is, a result of reporting an incorrect mobility state to a base station may be produced.

Figure 1H:
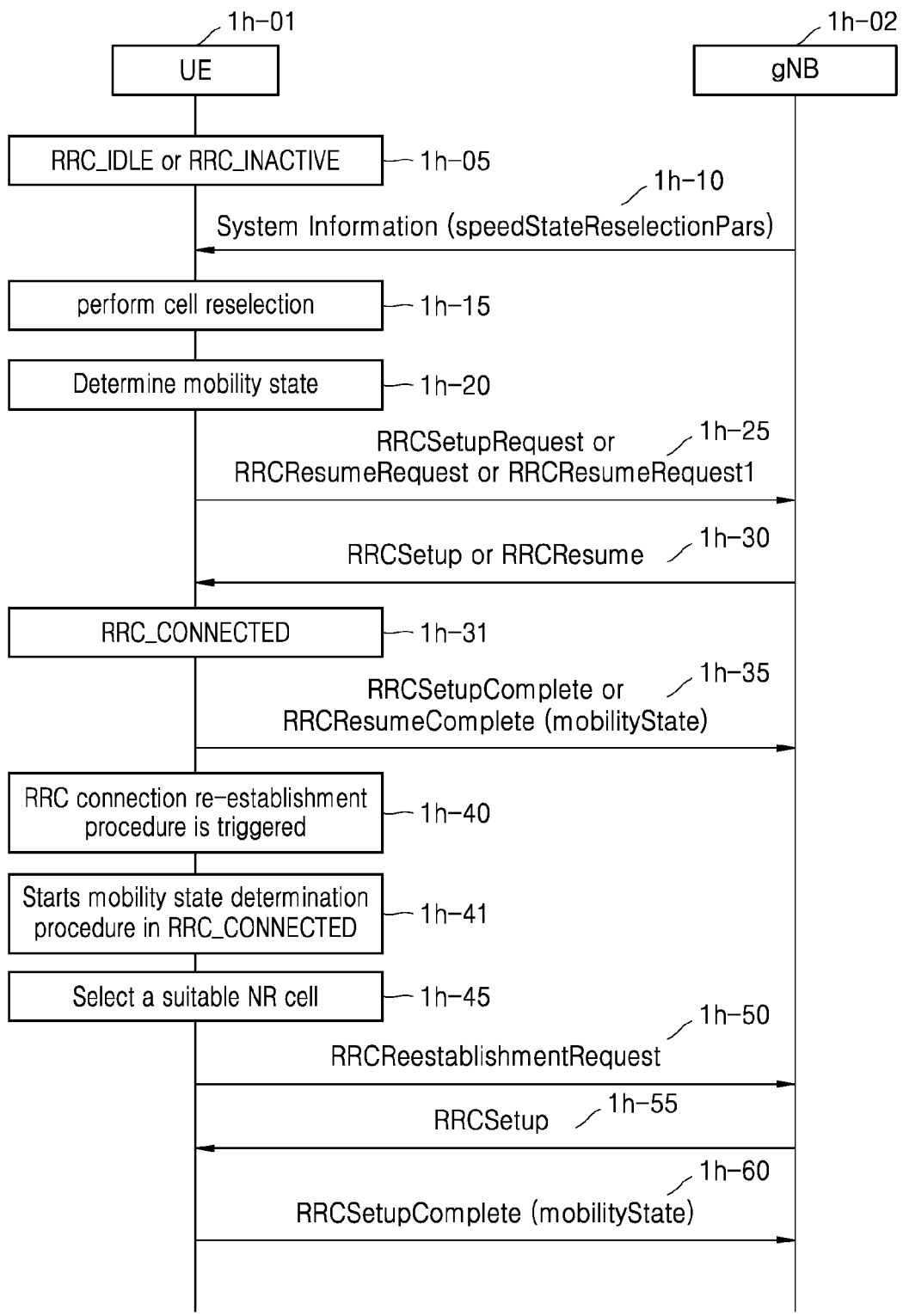
FIG. 1H is a flowchart of a process whereby a terminal reports a mobility state to an NR base station in an NR system, according to another embodiment of the disclosure.

FIG. 1H is a flowchart of a process whereby a terminal reports a mobility state to an NR base station in an NR system, according to another embodiment of the disclosure.

A terminal in an NR system according to an embodiment of the disclosure may determine a mobility state through a most recent cell selection or cell reselection procedure regardless of an RRC state (an RRC idle mode or an RRC inactive mode or an RRC connected mode) and report the mobility state to an NR base station. The terminal may determine or derive a mobility state based on a cell selection or cell reselection procedure in an RRC connected mode. When the terminal in the RRC connected mode receives, from a base station, an RRC connection setup message (RRCSetup) in response to an RRC connection reestablishment request message (RRCReestablishmentRequest), the terminal may include the mobility state determined in the RRC connected mode in the RRC connection setup complete message (RRCSetupComplete) and report the mobility state to an NR base station. According to an embodiment, the above-described two problems may be solved.

Referring to FIG. 1H, in operation 1h-05, a terminal 1h-01 may be in an RRC idle mode (RRC_IDLE) or an RRC inactive mode (RRC_INACTIVE).

In operation 1h-10, the terminal 1h-01 in the RRC idle mode or the RRC inactive mode may receive or obtain system information from a base station 1h-02. The system information may include information for the terminal 1h-01 to perform a cell selection or cell reselection process. In an embodiment, the system information may include parameters for determining a mobility state of the terminal 1h-01 (speedStateReselectionPars). The parameters for determining a mobility state of the terminal 1h-01 (speedStateReselectionPars) may include information (or parameters) as below.

- t-Evaluation: a duration value indicating evaluating criteria used to enter a mobility state (The duration of evaluating criteria to enter mobility states). For example, one of values such as 30 seconds, 60 seconds, 120 seconds, 180 seconds, and 240 seconds may be signaled.
- t-Evaluation may indicate $T_{CRmax}$, and this may indicate a duration used to determine a number of times of allowable cell reselection (This specifies the duration for evaluating allowed amount of cell reselection(s)).
- t-HystNormal: an additional duration value indicating evaluating criteria used to enter a normal mobility state (The additional duration for evaluating criteria to enter normal mobility state). For example, one of values such as 30 seconds, 60 seconds, 120 seconds, 180 seconds, and 240 seconds may be signaled.
- t-HystNormal may indicate $T_{CRmaxHyst}$, and this may indicate an additional period value before a terminal enters a normal mobility state (This specifies the additional time period before the UE can enter Normal mobility state).
- n-CellChangeMedium: a value of a number of times of cell changes for entering a medium mobility state (The number of cell changes to enter medium mobility state). For example, one of integer values of 1 to 16 may be signaled.
- n-CellChangeMedium may indicate $N_{CR\_M}$, and this may indicate a maximum number of times of cell reselection for entering a medium mobility state (This specifies the maximum number of cell reselections to enter Medium mobility state).
- n-CellChangeHigh: a value of a number of times of cell changes for entering a high mobility state (The number of cell changes to enter high mobility state). For example, one of integer values of 1 to 16 may be signaled, and a value greater than n-CellChangeMedium may be signaled.
- n-CellChangeHigh may indicate $N_{CR\_H}$, and this may indicate a maximum number of times of cell reselection for entering a high mobility state (This specifies the maximum number of cell reselections to enter High mobility state).
- q-HystSF: speed-based ScalingFactor parameter
  sf-Medium: an additional hysteresis parameter value used in a medium mobility state. For example, one of values of −6 dB, −4 dB, −2 dB, and 0 dB may be signaled.
  sf-High: an additional hysteresis parameter value used in a high mobility state. For example, one of values of −6 dB, −4 dB, −2 dB, and 0 dB may be signaled.

In operation 1h-15, the terminal 1h-01 in the RRC idle mode or the RRC inactive mode may perform a cell selection or cell reselection process.

In operation 1h-20, the terminal 1h-01 in the RRC idle mode or the RRC inactive mode may determine a mobility state. The terminal 1h-01 may determine a mobility state based on following certain conditions.

Medium mobility state conditions (Medium mobility state criteria)
When a number of times of cell reselection during $T_{CRmax}$ is equal to or greater than $N_{CR\_M}$ and less than or equal to $N_{CR\_H}$ (If number of cell reselections during time period $T_{CRmax}$ is greater than or equal to $N_{CR\_M}$ but less than or equal to $N_{CR\_H}$)

High mobility state conditions (High mobility state criteria)
When a number of times of cell reselection during $T_{CRmax}$ exceeds $N_{CR\_H}$ (If number of cell reselections during time period $T_{CRmax}$ is greater than $N_{CR\_H}$)

Normal mobility state conditions (normal mobility state criteria)
When medium mobility state conditions or high mobility state conditions are not met during $T_{CRmax}$ (criteria for either Medium or High mobility state is not detected during time period $T_{CRmaxHyst}$) or when a number of times of cell reselection during $T_{CRmax}$ is less than $N_{CR\_M}$ (If number of cell reselections during time period $T_{CRmax}$ is less than $N_{CR\_M}$)

In operation 1h-25, the terminal 1h-01 in the RRC idle mode or the RRC inactive mode may initiate an RRC connection establishment procedure or an RRC connection resume procedure to establish an RRC connection to the base station 1h-02. That is, in operation 1h-25, the terminal 1h-01 may transmit, to the base station 1h-02, an RRC connection request message (RRCSetupRequest) or an RRC connection resume request message (RRCResumeRequest or RRCResumeRequest1).

In operation 1h-30, the base station 1h-02 may transmit, to the terminal 1h-01, an RRC connection setup message (RRCSetup) or an RRC connection resume message (RRCResume), in response to the RRC connection request message or the RRC connection resume request message.

In operation 1h-31, the terminal 1h-01 that has received the RRC connection setup message or the RRC connection resume message may be shifted to the RRC connected mode (RRC_CONNECTED).

In operation 1h-35, the terminal 1h-01 in the RRC connected mode may transmit, to the base station 1h-02, a RRC connection setup complete message (RRCSetupComplete) or an RRC connection resume complete message (RRCResumeComplete). The RRC connection setup complete message or the RRC connection resume complete message may include a mobility state of the terminal 1h-01. For example, in the RRC connection setup complete message or the RRC connection resume complete message, a parameter indicating a mobility state of the terminal 1h-01, mobilityState, may be included. In detail, a mobility state immediately before the terminal 1h-01 is shifted to the RRC connected mode (RRC_CONNECTED) may be included in the RRC connection setup complete message or the RRC connection resume complete message. For example, the terminal 1h-01 may configure mobilityState, which is a parameter indicating a mobility state of the terminal 1h-01, as a mobility state of the terminal 1h-01 immediately before being shifted to the RRC connected mode (RRC_CONNECTED), and include the parameter in the RRC connection setup complete message or the RRC connection resume complete message. (include the mobilityState and set it to the mobility state (as specified in TS 38.304) of the UE just prior to entering RRC_CONNECTED state).

In operation 1h-40, an RRC connection re-establishment procedure may be triggered according to following certain conditions. In an embodiment, the certain conditions may indicate at least one of the following.

When a timer T316 is not configured, and a radio link failure (RLF) has occurred with respect to Master Cell Group (MCG) (upon detecting radio link failure of the MCG and T316 is not configured)

When a re-configuration with sync failure has occurred with respect to MCG (upon re-configuration with sync failure of the MCG)

When Mobility from NR failure has occurred (upon mobility from NR failure)

When an RRC connection reconfiguration failure has occurred (upon an RRC connection reconfiguration failure)

Except for an integrity check failure with respect to an RRC connection reestablishment message (RRCReestablishment), when an integrity check failure is received from lower layers concerning SRB1 or SRB2 (upon integrity check failure from lower layers concerning SRB1 or SBI2, except if the integrity check failure is detected on the RRCReestablishment message)

In operation 1h-40, when the terminal 1h-01 in the RRC connected mode initiates an RRC connection reestablishment procedure, the terminal 1h-01 may perform operations below.

When a timer T310 is running, the T310 timer may be stopped.

When a timer T312 is running, the timer T312 may be stopped.

When a timer T304 is running, the timer T304 may be stopped.

A timer T311 may be started.

MAC layer entity may be reset (reset MAC).

A cell selection process may be performed. For example, the cell selection process may be performed based on the 3GPP standard document TS 38.304. The terminal 1h-01 in the RRC connected mode may perform a mobility state determination procedure (determining a mobility state by applying mobility state conditions based on operation 1h-20 described above).

In operation 1h-45, the terminal 1h-01 in the RRC connected mode may select a suitable NR cell. When a suitable NR cell is selected, the terminal 1h-01 may stop the timer T311 that is running.—and start a timer T301. Here, a suitable cell may be a cell to which the terminal is currently connected or may be a new cell.

In operation 1h-50, the terminal 1h-01 in the RRC connected mode may transmit, to the selected suitable NR cell, an RRC connection reestablishment request message (RRCReestablishmentRequest).

In operation 1h-55, the NR base station 1h-02 that has received the RRC connection reestablishment request message may transmit an RRC connection setup message (RRCSetup) to the terminal 1h-01 in the RRC connected mode. According to an embodiment, when a terminal context of the terminal 1h-01 cannot be retrieved, the base station 1h-02 may transmit an RRC connection setup message to the terminal 1h-01 in the RRC connected mode.

In operation 1h-60, the terminal 1h-01 in the RRC connected mode may apply the received RRC connection setup message, and may transmit, in response to this, an RRC connection setup complete message (RRCSetupComplete) to the NR base station 1h-02. According to an embodiment of the disclosure, the terminal 1h-01 may include a mobility state determined or derived in operation 1h-41, in the RRC connection setup complete message.

According to an embodiment, the above-described two problems may be solved. That is, the terminal 1h-01 does not have to store the mobility state already reported in operation 1h-35. Also, the terminal 1h-01 may avoid reporting an incorrect mobility state to the base station 1h-02 as the mobility state determined in operation 1h-41 is reported to a base station. However, because the terminal 1h-01 performs a cell selection process in operation 1h-40, it is highly likely that the terminal 1h-01 includes a normal mobility state in the RRC connection setup complete message.

Figure 1I:
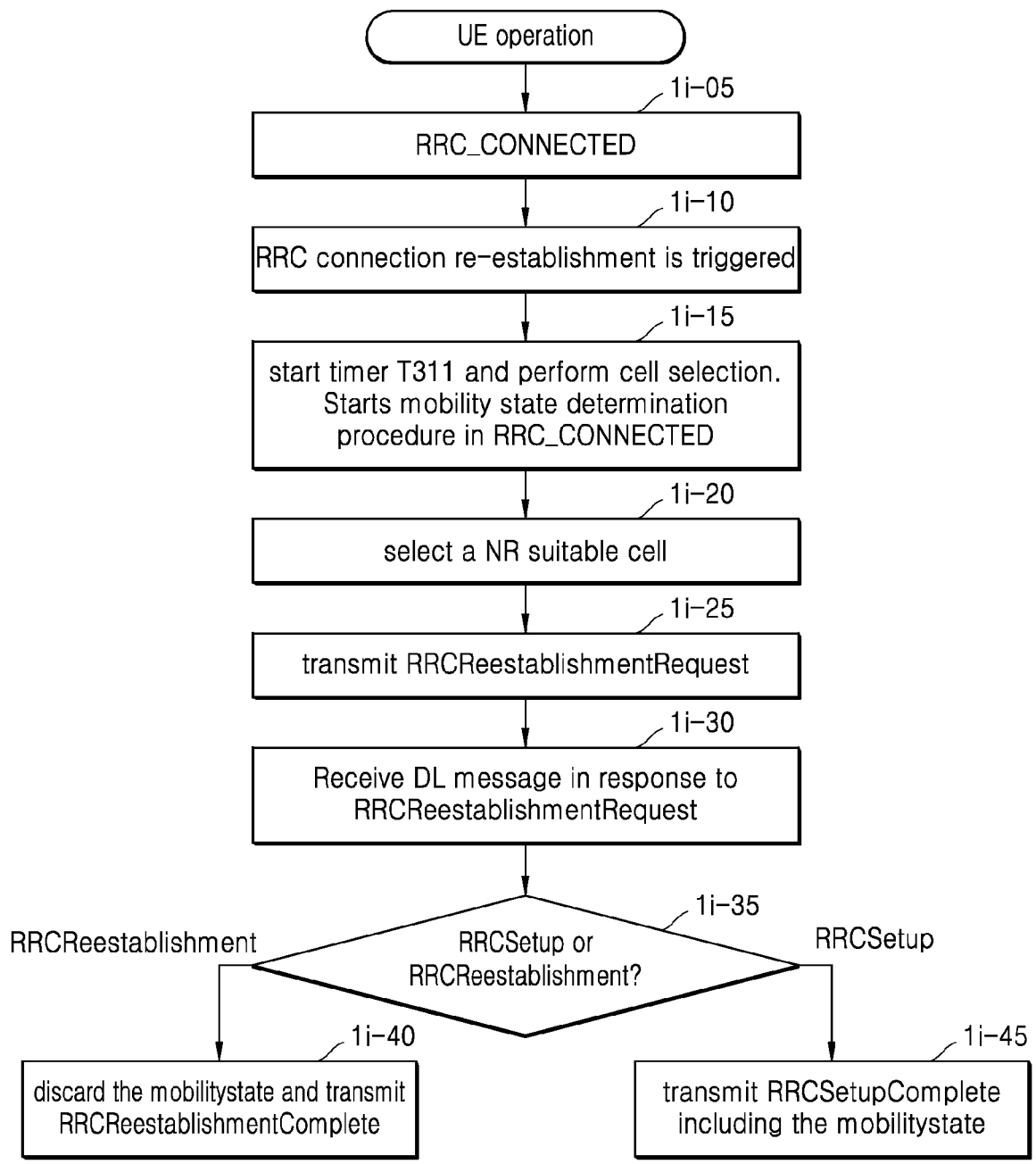
FIG. 1I is a diagram for describing an operation of a terminal reporting a mobility state to an NR base station in an NR system, according to an embodiment of the disclosure.

FIG. 1I is a diagram for describing an operation of a terminal reporting a mobility state to an NR base station in an NR system, according to an embodiment of the disclosure.

Referring to FIG. 1I, the terminal may be in an RRC connected mode (RRC_CONNECTED) in operation 1i-05.

In operation 1i-10, the terminal in the RRC connected mode may initiate an RRC connection reestablishment procedure according to certain conditions. The conditions may follow the above-described embodiment.

In operation 1i-15, the terminal may start a timer T311 and perform a cell selection process. Here, the terminal in the RRC connected mode may perform a mobility state determination procedure.

In operation 1i-20, the terminal in the RRC connected mode may select a suitable NR cell. Here, a suitable cell may be a cell to which the terminal is currently connected or may be a new cell.

In operation 1i-25, the terminal may transmit an RRC connection reestablishment request message (RRCReestablishmentRequest) to the selected suitable NR cell.

In operation 1i-30, the terminal may receive a downlink RRC message in response to the RRC connection reestablishment request message.

In operation 1i-35, the terminal may determine whether the received downlink RRC message is an RRC connection setup message (RRCSetup) or an RRC connection reestablishment message (RRCReestablishment).

In operation 1i-40, when the terminal in the RRC connected mode has received the RRC connection reestablishment message in operation 1i-30, the terminal may discard the mobility state determined (or derived) in the previous operation (operation 1i-15 or operation 1i-20), and transmit the RRC connection reestablishment complete message (RRCReestablishmentComplete) to the selected suitable NR cell. When the terminal in the RRC connected mode may include the determined (or derived) mobility state in the RRC connection reestablishment complete message, the terminal may include the determined (or derived) mobility state in the RRC connection reestablishment completion message and transmit the message to the selected suitable NR cell.

In operation 1i-45, when the terminal in the RRC connected mode has received the RRC connection setup message (RRCSetup) in operation 1i-30, the terminal may include the mobility state determined (or derived) in the previous operation (operation 1i-15 or operation 1i-20) in the RRC connection reestablishment complete message (RRCReestablishmentComplete) and transmit the message to the selected suitable NR cell.

Figure 1J:
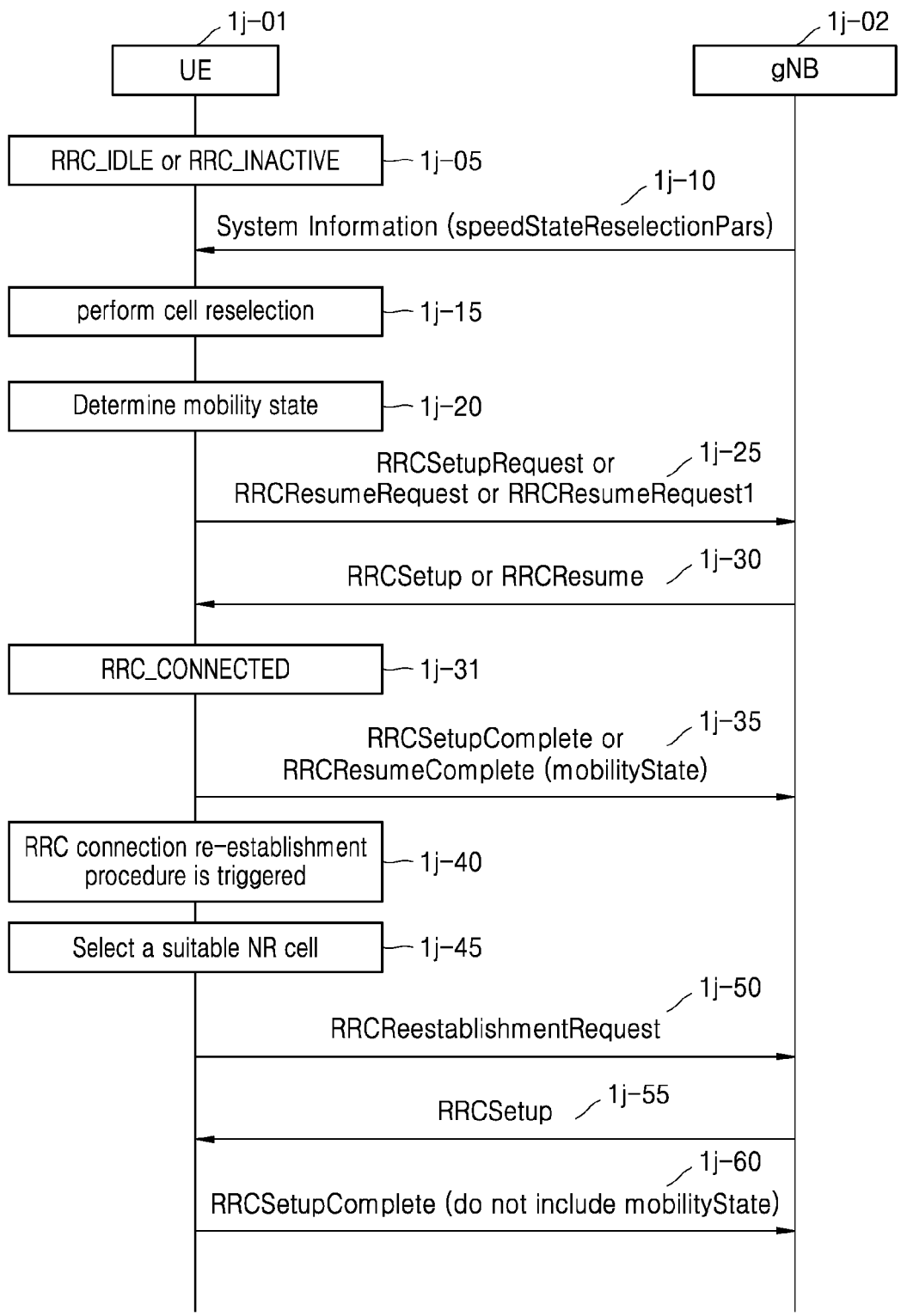
FIG. 1J is a flowchart of a process whereby a terminal reports a mobility state to an NR base station in an NR system, according to another embodiment of the disclosure.

FIG. 1J is a flowchart of a process whereby a terminal reports a mobility state to an NR base station in an NR system, according to another embodiment of the disclosure.

A terminal in an NR system according to the embodiment of the disclosure may determine a mobility state in an RRC idle mode or an RRC inactive mode. According to an embodiment, a terminal in an RRC connected mode may not determine a mobility state. Thus, when the terminal in the RRC connected mode receives from an NR base station an RRC connection setup message (RRCSetup) in response to the RRC connection reestablishment request message (RRCReestablishmentRequest), the terminal may report to the NR base station without including a mobility state in the RRC connection setup complete message (RRCSetupComplete).

Referring to FIG. 1J, in operation 1j-05, a terminal 1j-01 may be in an RRC idle mode (RRC_IDLE) or an RRC inactive mode (RRC_INACTIVE).

In operation 1j-10, the terminal 1j-01 in the RRC idle mode or the RRC inactive mode may receive or obtain system information from a base station 1j-02. The system information may include information for the terminal 1j-01 to perform a cell selection or cell reselection process. In an embodiment, the system information may include parameters for determining a mobility state of the terminal 1j-01 (speedStateReselectionPars). The parameters for determining a mobility state of the terminal 1j-01 (speedStateReselectionPars) may include information (or parameters) as below.

t-Evaluation: a duration value indicating evaluating criteria used to enter a mobility state (The duration of evaluating criteria to enter mobility states). For example, one of values such as 30 seconds, 60 seconds, 120 seconds, 180 seconds, and 240 seconds may be signaled.

t-Evaluation may indicate $T_{CRmax}$, and this may indicate a duration used to determine an allowable number of times of cell reselection (This specifies the duration for evaluating allowed amount of cell reselection(s)).

t-HystNormal: an additional duration value indicating evaluating criteria used to enter a normal mobility state (The additional duration for evaluating criteria to enter normal mobility state). For example, one of values such as 30 seconds, 60 seconds, 120 seconds, 180 seconds, and 240 seconds may be signaled.

t-HystNormal may indicate $T_{CRmaxHyst}$, and this may indicate an additional period value before a terminal enters a normal mobility state (This specifies the additional time period before the UE can enter Normal mobility state).

n-CellChangeMedium: a value of a number of times of cell changes for entering a medium mobility state (The number of cell changes to enter medium mobility state). For example, one of integer values of 1 to 16 may be signaled.

n-CellChangeMedium may indicate $N_{CR\_M}$, and this may indicate a maximum number of times of cell reselection for entering a medium mobility state (This specifies the maximum number of cell reselections to enter Medium mobility state).

n-CellChangeHigh: a value of a number of times of cell changes for entering a high mobility state (The number of cell changes to enter high mobility state). For example, one of integer values of 1 to 16 may be signaled, and a value greater than n-CellChangeMedium may be signaled.

n-CellChangeHigh may indicate $N_{CR\_H}$, and this may indicate a maximum number of times of cell reselection for entering a high mobility state (This specifies the maximum number of cell reselections to enter High mobility state).

q-HystSF: speed-based ScalingFactor parameter sf-Medium: an additional hysteresis parameter value used in a medium mobility state. For example, one of values of −6 dB, −4 dB, −2 dB, and 0 dB may be signaled.

sf-High: an additional hysteresis parameter value used in a high mobility state. For example, one of values of −6 dB, −4 dB, −2 dB, and 0 dB may be signaled.

In operation 1j-15, the terminal 1j-01 in the RRC idle mode or the RRC inactive mode may perform a cell selection or cell reselection process.

In operation 1j-20, the terminal 1j-01 in the RRC idle mode or the RRC inactive mode may determine a mobility state. The terminal 1j-01 may determine a mobility state based on following certain conditions.

Medium mobility state conditions (Medium mobility state criteria)

When a number of times of cell reselection during $T_{CRmax}$ is equal to or greater than $N_{CR\_M}$ and less than or equal to $N_{CR\_H}$ (If number of cell reselections during time period $T_{CRmax}$ is greater than or equal to $N_{CR\_M}$ but less than or equal to $N_{CR\_H}$)

High mobility state conditions (High mobility state criteria)

When a number of times of cell reselection during $T_{CRmax}$ exceeds $N_{CR\_H}$ (If number of cell reselections during time period $T_{CRmax}$ is greater than $N_{CR\_H}$)

Normal mobility state conditions (normal mobility state criteria)

When medium mobility state conditions or high mobility state conditions are not met during $T_{CRmax}$ (criteria for either Medium or High mobility state is not detected during time period $T_{CRmaxHyst}$) or when a number of times of cell reselection during $T_{CRmax}$ is less than $N_{CR\_M}$ (If number of cell reselections during time period $T_{CRmax}$ is less than $N_{CR\_M}$)

In operation 1j-25, the terminal 1j-01 in the RRC idle mode or the RRC inactive mode may initiate an RRC connection establishment procedure or an RRC connection resume procedure to establish an RRC connection to the base station 1j-02. That is, in operation 1j-25, the terminal 1j-01 may transmit, to the base station 1j-02, an RRC connection request message (RRCSetupRequest) or an RRC connection resume request message (RRCResumeRequest or RRCResumeRequest1).

In operation 1j-30, the base station 1j-02 may transmit, to the terminal 1j-01, an RRC connection setup message (RRCSetup) or an RRC connection resume message (RR- CResume), in response to the RRC connection request message or the RRC connection resume request message.

In operation 1*j*-31, the terminal 1*j*-01 that has received the RRC connection setup message or the RRC connection resume message may be shifted (or transition) to the RRC connected mode (RRC_CONNECTED).

In operation 1*j*-35, the terminal 1*j*-01 in the RRC connected mode may transmit, to the base station 1*j*-02, a RRC connection setup complete message (RRCSetupComplete) or an RRC connection resume complete message (RRCResumeComplete). The RRC connection setup complete message or the RRC connection resume complete message may include a mobility state of the terminal 1*j*-01. For example, in the RRC connection setup complete message or the RRC connection resume complete message, a parameter indicating a mobility state of the terminal 1*j*-01, mobilityState, may be included. In detail, a mobility state immediately before the terminal 1*j*-01 is shifted to the RRC connected mode (RRC_CONNECTED) may be included in the RRC connection setup complete message or the RRC connection resume complete message. For example, the terminal 1*j*-01 may configure mobilityState, which is a parameter indicating a mobility state of the terminal 1*j*-01, as a mobility state of the terminal 1*j*-01 immediately before being shifted to the RRC connected mode (RRC_CONNECTED), and include the parameter in the RRC connection setup complete message or the RRC connection resume complete message. (include the mobilityState and set it to the mobility state (as specified in TS 38.304) of the UE just prior to entering RRC_CONNECTED state).

In operation 1*j*-40, an RRC connection re-establishment procedure may be triggered according to following certain conditions. In an embodiment, the certain conditions may indicate at least one of the following.

When a timer T316 is not configured, and a radio link failure (RLF) has occurred with respect to Master Cell Group (MCG) (upon detecting radio link failure of the MCG and T316 is not configured)

When a re-configuration with sync failure has occurred with respect to MCG (upon re-configuration with sync failure of the MCG)

When Mobility from NR failure has occurred (upon mobility from NR failure)

When an RRC connection reconfiguration failure has occurred (upon an RRC connection reconfiguration failure)

Except for an integrity check failure with respect to an RRC connection reestablishment message (RRCReestablishment), when an integrity check failure is received from lower layers concerning SRB1 or SRB2 (upon integrity check failure from lower layers concerning SRB1 or SBI2, except if the integrity check failure is detected on the RRCReestablishment message)

In operation 1*j*-40, when the terminal 1*j*-01 in the RRC connected mode initiates an RRC connection reestablishment procedure, the terminal 1*j*-01 may perform operations below.

When a timer T310 is running, the timer T310 may be stopped.
When a timer T312 is running, the timer T312 may be stopped.
When a timer T304 is running, the timer T304 may be stopped.
A timer T311 may be started.
MAC layer entity may be reset (reset MAC).

A cell selection process may be performed. For example, the cell selection process may be performed based on the 3GPP standard document TS 38.304.

In operation 1*j*-45, the terminal 1*j*-01 in the RRC connected mode may select a suitable NR cell. When a suitable NR cell is selected, the terminal 1*j*-01 may stop the timer T311 that is running.—and start a timer T301. Here, a suitable cell may be a cell to which the terminal is currently connected or may be a new cell.

In operation 1*j*-50, the terminal 1*j*-01 in the RRC connected mode may transmit, to the selected suitable NR cell, an RRC connection reestablishment request message (RRCReestablishmentRequest).

In operation 1*j*-55, the NR base station 1*j*-02 that has received the RRC connection reestablishment request message may transmit an RRC connection setup message (RRC Setup) to the terminal 1*j*-01 in the RRC connected mode. According to an embodiment, when a terminal context of the terminal 1*j*-01 cannot be retrieved, the base station 1*j*-02 may transmit an RRC connection setup message to the terminal 1*j*-01 in the RRC connected mode.

In operation 1*j*-60, the terminal 1*j*-01 in the RRC connected mode may apply the received RRC connection setup message, and may transmit, in response to this, an RRC connection setup complete message (RRCSetupComplete) to the NR base station 1*j*-02. According to an embodiment of the disclosure, the terminal 1*j*-01 may not include a mobility state in the RRC connection setup complete message.

Figure 1K:
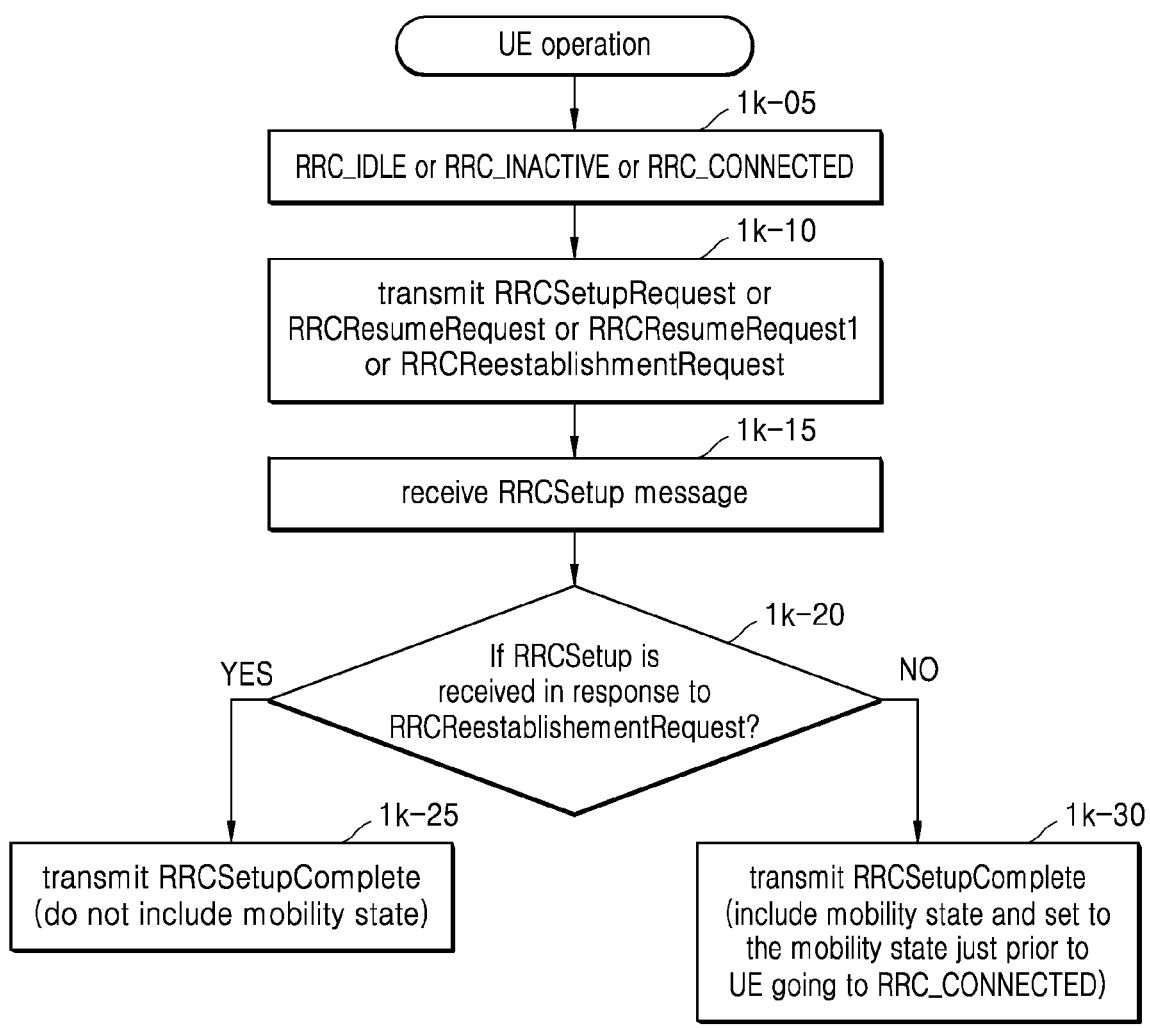
FIG. 1K is a diagram for describing an operation of a terminal reporting a mobility state to an NR base station in an NR system, according to another embodiment of the disclosure.

FIG. 1K is a diagram for describing an operation of a terminal reporting a mobility state to an NR base station in an NR system, according to another embodiment of the disclosure.

Referring to FIG. 1K, in operation 1*k*-05, the terminal may be in an RRC idle mode or an RRC inactive mode or an RRC connected mode.

In operation 1*k*-10, when the terminal is in an RRC idle more or an RRC inactive mode, the terminal may perform a cell selection or cell reselection process, and may transmit, to a (re)selected NR cell, an RRC connection setup request message (RRCSetupRequest) or an RRC connection resume request message (RRCResumeRequest) or an RRC connection resume request 1 message (RRCResumeRequest1). Also after transmitting the above message, the terminal may continue performing a cell reselection process and determine a mobility state based on the reselection process.

In operation 1*k*-10, when the terminal is in the RRC connected mode, the terminal may select a suitable NR cell and transmit an RRC connection reestablishment request message (RRCReestablishmentRequest) to the selected suitable NR cell. The terminal in the RRC connected mode may not determine a mobility state.

In operation 1*k*-15, the terminal may receive an RRC connection setup message (RRC Setup) in response to operation 1*k*-10.

In operation 1*k*-20, the terminal may determine whether the received RRC connection setup message is a response message to the RRC connection reestablishment request message.

In operation 1*k*-25, when the terminal in the RRC connected mode receives an RRC connection setup message in response to the RRC connection reestablishment request message, the terminal may transmit an RRC connection setup complete message without including a mobility state of the terminal in the RRC connection setup complete message.

In operation 1k-30, when the terminal in the RRC idle mode or the RRC inactive mode receives an RRC connection setup message in response to an RRC connection setup request message (RRCSetupRequest) or an RRC connection resume request message (RRCResumeRequest) or an RRC connection resume request 1 message (RRCResumeRequest1), the terminal may include a mobility state derived before being shifted to the RRC connected mode, in the RRC connection setup complete message, and transmit the RRC connection setup complete message.

When the terminal according to an embodiment of the disclosure receives an RRC connection setup message in response to an RRC connection setup request message (RRCSetupRequest) or an RRC connection resume request message (RRCResumeRequest) or an RRC connection resume request 1 message (RRCResume Request1), the terminal may include a mobility state in the RRC connection setup complete message, and when the terminal receives an RRC connection setup message in response to the RRC connection reestablishment request message, the terminal may not accommodate the mobility state in the RRC connection setup complete message.

Figure 1L:
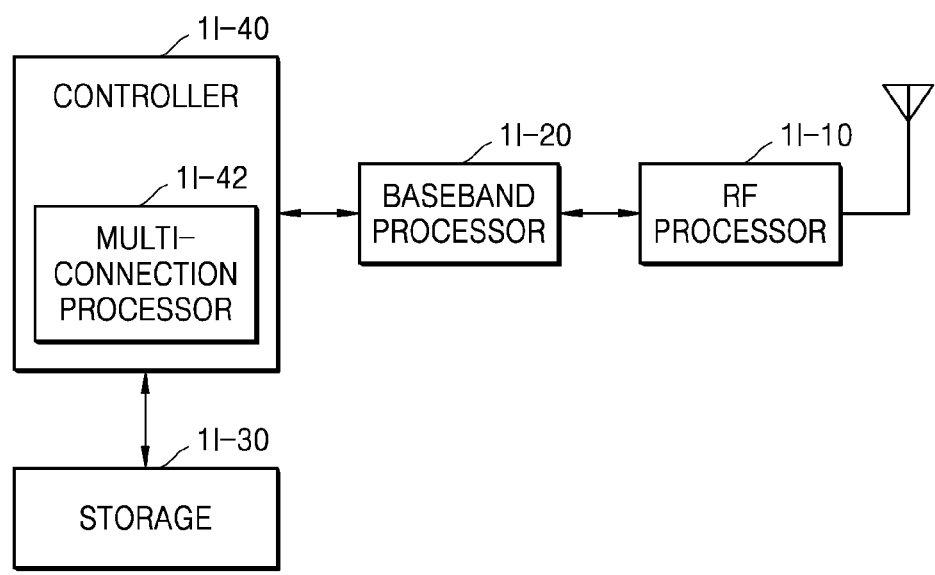
FIG. 1L is a block diagram illustrating an internal structure of a terminal according to an embodiment of the disclosure.

FIG. 1L is a block diagram illustrating an internal structure of a terminal according to an embodiment of the disclosure.

Referring to FIG. 1L, the terminal may include a radio frequency (RF) processor 1L-10, a baseband processor 1L-20, a storage 1L-30, and a controller 1L-40. The terminal, however, is not limited to the above example, and may further include fewer components or more components than those illustrated in FIG. 1L.

The RF processor 1L-10 may perform a function of transmitting or receiving a signal via a radio channel, such as signal band conversion, amplification, or the like. That is, the RF processor 1L-10 may up-convert a baseband signal provided from the baseband processor 1L-20, into an RF band signal and transmit the same via an antenna, and down-convert an RF band signal received via an antenna, into a baseband signal. For example, the RF processor 1L-10 may include a transmission filter, a reception filter, an amplifier, a mixer, an oscillator, a digital to analog convertor (DAC), an analog to digital convertor (ADC), or the like. However, the RF processor 1L-10 is not limited to the above example. In FIG. 1L, while only one antenna is illustrated, the terminal may include multiple antennas. Also, the RF processor 1L-10 may include multiple RF chains. Further, the RF processor 1L-10 may perform beamforming. For beamforming, the RF processor 1L-10 may adjust a phase and size of each signal transmitted or received via multiple antennas or antenna elements. Also, The RF processor 1L-10 may perform multiple-input multiple-output (MIMO) and may receive several layers when performing a MIMO operation.

The baseband processor 1L-20 may perform a conversion function between a baseband signal and a bit string according to the physical layer specifications of a system. For example, during data transmission, the baseband processor 1L-20 may encode and modulate a transmission bit string to generate complex symbols. Also, during data reception, the baseband processor 1L-20 may reconfigure a reception bit string by demodulating and decoding a baseband signal provided by the RF processor 1L-10. For example, when using the OFDM method, during data transmission, the baseband processor 1L-20 may generate complex symbols by encoding and modulating a transmission bit string, and map the generated complex symbols to sub-carriers, and then constitute OFDM symbols through inverse fast Fourier transform (IFFT) operation and cyclic prefix (CP) insertion. Also, during data reception, the baseband processor 1L-20 may divide a baseband signal provided by the RF processor 1L-10, into units of OFDM symbols, and reconfigure signals mapped to subcarriers, through fast Fourier transform (FFT), and reconfigure a reception bit string through demodulation and decoding.

The baseband processor 1L-20 and the RF processor 1L-10 may transmit and receive a signal as described above. Accordingly, the baseband processor 1L-20 and the RF processor 1L-10 may be referred to as a transmitter, a receiver, a transceiver, or a communicator. Further, at least one of the baseband processor 1L-20 and the RF processor 1L-10 may include multiple communication modules to support different multiple radio access techniques. In addition, at least one of the baseband processor 1L-20 and the RF processor 1L-10 may include different communication modules from each other, to process signals of different frequency bands from each other. For example, the different radio access techniques may include a wireless local area network (LAN) (e.g., IEEE 802.11), a cellular network (e.g., LTE), or the like. Also, the different frequency bands may include super high frequency (SHF) bands (e.g., 2. NRHz, NRhz), millimeter (mm) wave (e.g., 60 GHz) bands. The terminal may transmit or receive a signal to or from a base station by using the baseband processor 1L-20 or the RF processor 1L-10, and the signal may include control information and data.

The storage 1L-30 may store data such as a basic program for an operation of a terminal, an application program, setting information, or the like. In particular, the storage 1L-30 may store data such as a basic program for the operation of the terminal described above, an application program, setting information, or the like. Also, the storage 1L-30 may provide stored data according to a request from the controller 1L-40.

The controller 1L-40 may control the overall operations of the terminal. For example, the controller 1L-40 transmits or receives a signal via the baseband processor 1L-20 and the RF processor 1L-10. Also, the controller 1L-40 records and reads data to and from the storage 1L-30. To this end, the controller 1L-40 may include at least one processor. For example, the controller 1L-40 may include a communicator processor (CP) performing control for communication and an application processor (AP) controlling upper layers such as an application program. Also, according to an embodiment of the disclosure, the controller 1L-40 may include a multi-connection processor 1L-42 configured to process a process operating in a multi-connected mode. Also, at least one component in a terminal may be implemented as a single chip.

Figure 1M:
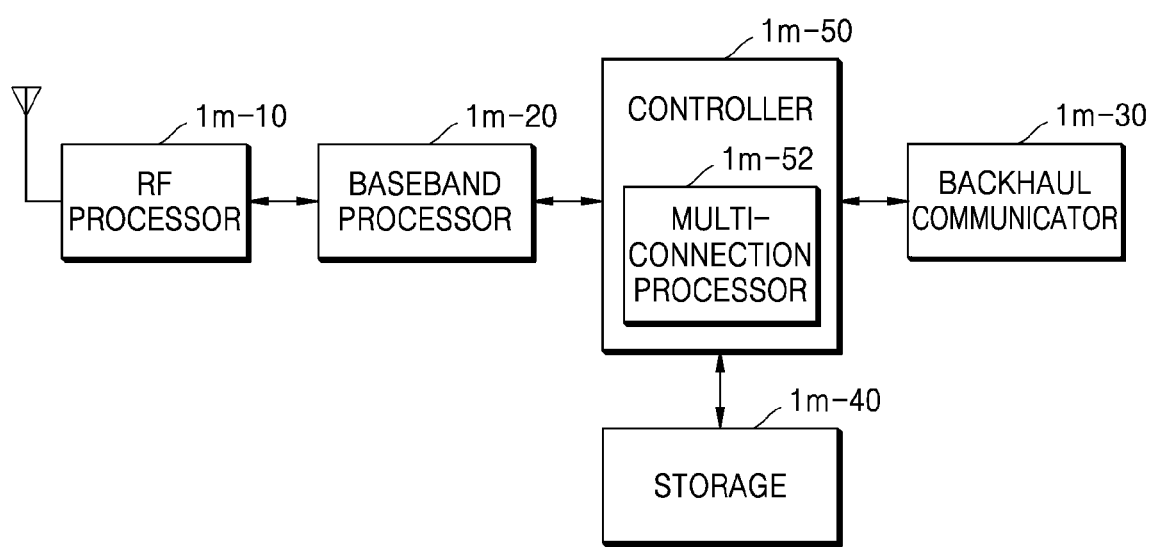
FIG. 1M is a block diagram illustrating a configuration of a base station according to an embodiment of the disclosure.

FIG. 1M is a block diagram illustrating a configuration of a base station according to an embodiment of the disclosure.

As illustrated in FIG. 1M, the base station may include an RF processor 1M-10, a baseband processor 1M-20, a backhaul communicator 1M-30, a storage 1M-40, and a controller 1M-50. The base station, however, is not limited to the above example, and may further include fewer components or more components than those illustrated in FIG. 1M.

The RF processor 1M-10 may perform a function of transmitting or receiving a signal via a radio channel, such as signal band conversion, amplification, or the like. That is, the RF processor 1M-10 may up-convert a baseband signal provided from the baseband processor 1M-20, into an RF band signal and transmit the same via an antenna, and down-convert an RF band signal received via an antenna into a baseband signal. For example, the RF processor 1M-10 may include a transmission filter, a reception filter, an amplifier, a mixer, an oscillator, a DAC, an ADC, or the like. In FIG. 1M, while only one antenna is illustrated, the RF processor 1M-10 may include multiple antennas.

Also, the RF processor 1M-10 may include multiple RF chains. Further, the RF processor 1M-10 may perform beamforming. For beamforming, the RF processor 1M-10 may adjust a phase and size of each signal transmitted or received via multiple antennas or antenna elements. The RF processor 1M-10 may perform a downlink MIMO operation by transmitting at least one layer.

The baseband processor 1M-20 may perform a conversion function between a baseband signal and a bit string according to the physical layer specifications. For example, during data transmission, the baseband processor 1M-20 may encode and modulate a transmission bit string to generate complex symbols. Also, during data reception, the baseband processor 1M-20 may reconfigure a reception bit string by demodulating and decoding a baseband signal provided by the RF processor 1M-10. For example, when using the OFDM method, during data transmission, the baseband processor 1M-20 may generate complex symbols by encoding and modulating a transmission bit string, and map the complex symbols to subcarriers, and then constitute OFDM symbols through IFFT operation and CP insertion. Also, during data reception, the baseband processor 1M-20 may divide a baseband signal provided by the RF processor 1M-10, into units of OFDM symbols, and reconfigure signals mapped to subcarriers, through FFT operation, and reconfigure a reception bit string through demodulation and decoding. The baseband processor 1M-20 and the RF processor 1M-10 transmit and receive a signal as described above. Accordingly, the baseband processor 1M-20 and the RF processor 1M-10 may be referred to as a transmitter, a receiver, a transceiver, a communicator, or a wireless communicator. The base station may transmit or receive a signal to or from a terminal by using the baseband processor 1M-20 or the RF processor 1M-10, and the signal may include control information and data.

The backhaul communicator 1M-30 may provide an interface to perform communication with other nodes in a network. That is, the backhaul communicator 1M-30 may convert a bit string transmitted from a base station to another node such as a sub-base station, a core network, or the like, into a physical signal, and convert a physical signal received from the other node into a bit string.

The storage 1M-40 may store data such as a basic program for an operation of a base station, an application program, setting information, or the like. In particular, the storage 1M-40 may store information about a bearer allocated to a connected terminal, a measurement result reported by the connected terminal, or the like. Also, the storage 1M-40 may provide multiple connections to a terminal or store information that serves as criteria for determining whether to stop the connections. Also, the storage 1M-40 may provide stored data according to a request from the controller 1M-50. The storage 1M-40 may be configured with a storage medium, such as ROM, RAM, a hard disk, CD-ROM, or DVD, or a combination thereof. Also, the storage 1M-40 may include a plurality of memories.

The controller 1M-50 may control the overall operations of the base station. For example, the controller 1M-50 may transmit or receive a signal via the baseband processor 1M-20 and the RF processor 1M-10 or via the backhaul communicator 1M-30. Also, the controller 1M-50 records and reads data to and from the storage 1M-40. To this end, the controller 1M-50 may include at least one processor.

Also, according to an embodiment of the disclosure, the controller 1M-50 may include a multi-connection processor 1M-52 configured to process a process operating in a multi-connected mode.

Figure 2:
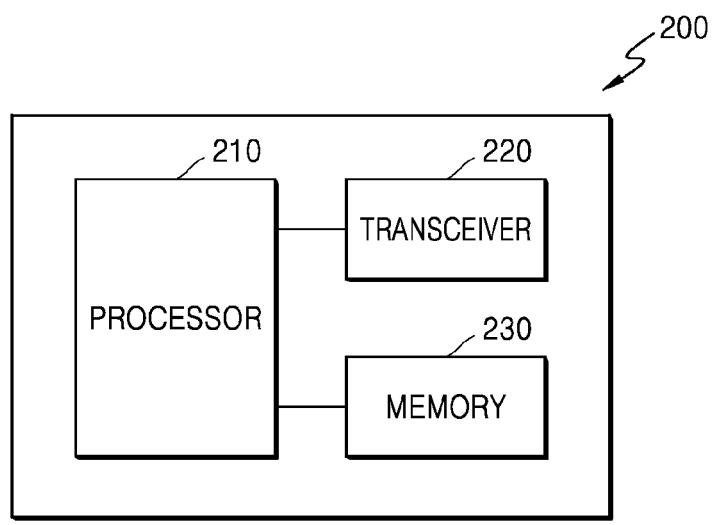
FIG. 2 is a diagram for describing a terminal according to an exemplary embodiment of the disclosure.

FIG. 2 is a diagram for describing a terminal according to an exemplary embodiment of the disclosure.

A terminal 200 may include a processor 210, a transceiver 220, and a memory 230. However, not all of the illustrated components are essential ones, and thus, the terminal 200 may include more components or fewer components than the illustrated ones. Also, the processor 210, the transceiver 220, and the memory 230 may be implemented as a single chip according to circumstances.

The processor 210 may include at least one processor or other processing devices for controlling disclosed functions, processes and/or methods. An operation of the terminal 200 may be implemented using the processor 210.

The transceiver 220 may include an RF transmitter for up-converting and amplifying a transmitted signal and an RF receiver for down-converting a frequency of a received signal. However, according to another embodiment, the transceiver 220 may be implemented using more or fewer components than those illustrated.

The transceiver 220 may be connected to the processor 210 and transmit and/or receive a signal. A signal may include control information and data. Also, the transceiver 220 may receive a signal via a radio channel and output the same to the processor 210. The transceiver 220 may transmit a signal output from the processor 210, via a radio channel.

The memory 230 may store control information or data included in a signal obtained using the terminal 200. The memory 230 may be connected to the processor 210 and may store at least one command or protocol or parameter with respect to disclosed functions, processes, and/or methods. The memory 230 may include a ROM (read-only memory) and/or RAM (random access memory) and/or hard disk and/or CD-ROM and/or DVD and/or other storage devices.

Figure 3:
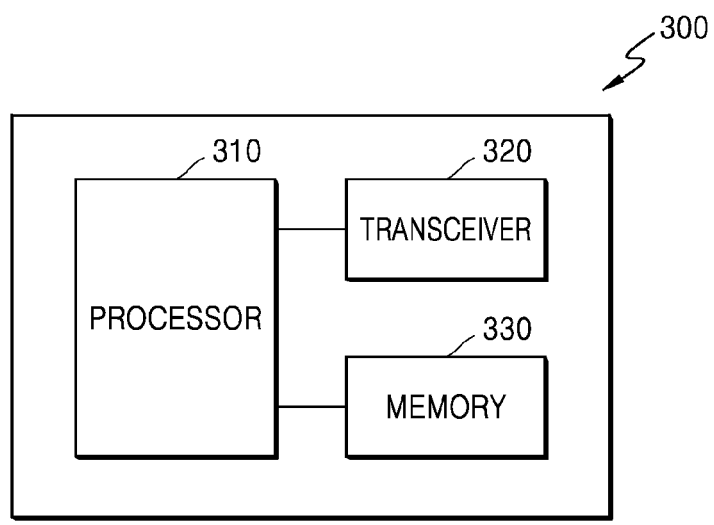
FIG. 3 is a diagram for describing a base station according to an exemplary embodiment of the disclosure.

FIG. 3 is a diagram for describing a base station according to an exemplary embodiment of the disclosure.

A base station 300 may include a processor 310, a transceiver 320, and a memory 330. However, not all of the illustrated components are essential ones, and the base station 300 may include more components or fewer components than the illustrated ones. Also, the processor 310, the transceiver 320, and the memory 330 may be implemented as a single chip according to circumstances.

The processor 310 may include at least one processor or other processing devices for controlling disclosed functions, processes and/or methods. An operation of the base station 300 may be implemented using the processor 310.

The transceiver 320 may include an RF transmitter for up-converting and amplifying a transmitted signal and an RF receiver for down-converting a frequency of a received signal. However, according to another embodiment, the transceiver 320 may be implemented using more or fewer components than those illustrated.

The transceiver 320 may be connected to the processor 310 and transmit and/or receive a signal. A signal may include control information and data. Also, the transceiver 320 may receive a signal via a radio channel and output the same to the processor 310. The transceiver 320 may transmit a signal output from the processor 310, via a radio channel.

The memory 330 may store control information or data included in a signal obtained using the base station 300. The memory 330 may be connected to the processor 310 and may store at least one command or protocol or parameter with respect to disclosed functions, processes, and/or methods. The memory 330 may include a ROM (read-only memory) and/or RAM (random access memory) and/or hard disk and/or CD-ROM and/or DVD and/or other storage devices.

The methods according to the embodiments of the disclosure described in the claims or specification of the disclosure may be implemented in the form of hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to embodiments of the disclosure as described in the specification or in the following claims.

The programs (e.g., software modules or software) may be stored in RAM, a non-volatile memory including a flash memory, ROM, an electrically erasable programmable read-only memory (EEPROM), a magnetic disc storage device, CD-ROM, DVD, or other types of optical storage device, or a magnetic cassette. Alternatively, the programs may be stored in a memory including a combination of some or all of the above-mentioned memories. In addition, each constituent memory may be included by a plural number.

The programs may also be stored in an attachable storage device which is accessible through a communication network configured with the Internet, an intranet, a local area network (LAN), a wide LAN (WLAN), or a storage area network (SAN), or a combination thereof. The storage device may be connected to an apparatus performing the embodiments of the disclosure through an external port. Another storage device on a communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation, and the disclosure is not limited thereto. As such, an element expressed in a plural form may also be configured as a single element, and an element expressed in a singular form may also be configured as plural elements.

Meanwhile, the embodiments disclosed in the present specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the embodiments of the disclosure may be combined with each other as required. For example, parts of an embodiment of the disclosure may be combined with parts of another embodiment of the disclosure. Also, other modification examples of the embodiments, based on the technical idea of the embodiments described above, may also be applied to other systems such as an LTE system, or 5G or NR system.

A storage medium that can be read by a device may be provided in the form of a non-transitory storage medium. Here, a 'non-transitory storage medium' is a tangible device and only means that it does not contain a signal (e.g., electromagnetic wave). The term does not distinguish the case where data is semi-permanently stored in a storage medium from the case where data is temporarily stored. For example, the 'non-transitory storage medium' may include a buffer in which data is temporarily stored.

According to an embodiment, a method according to various embodiments disclosed in the present specification may be included in a computer program product and provided in that form. Computer program products can be traded between sellers and buyers as commodities. Computer program products may be distributed in the form of a device-readable storage medium (e.g., compact disc read only memory (CD-ROM)), or through an application store (e.g., Play Store™) or between two user devices (e.g., smartphones) directly or online (e.g., downloaded or uploaded). In the case of online distribution, at least some of the computer program products (e.g., downloadable apps) may be at least temporarily stored or temporarily generated in a device-readable storage medium such as a manufacturer's server, an application store's server, or a relay server's memory.

The invention claimed is:

1. A method, performed by a wireless terminal, of reporting a mobility state, the method comprising:
receiving, from a base station, system information including a parameter speedStateReselectionPars for determining a mobility state of the wireless terminal;
determining the mobility state of the wireless terminal based on the system information;
transmitting, to the base station, at least one of a radio resource control (RRC) connection resume request message (RRCResumeRequest) or an RRC connection resume request message1 (RRCResumeRequest1) in an RRC inactive state;
receiving, from the base station, an RRC connection setup message (RRCSetup) in response to the at least one of the RRCResumeRequest or the RRCResumeRequest1; and
transmitting, to the base station, an RRC connection setup complete message (RRCSetupComplete),
wherein, based on reception of the RRCSetup in response to the at least one of the RRCResumeRequest or the RRCResumeRequest1, the mobility state determined based on the system information is included in the RRCSetupComplete.

2. The method of claim 1, further comprising transmitting, to the base station, an RRC connection reestablishment request message (RRCReestablishmentRequest),
wherein, based on reception of the RRCSetup in response to the RRCReestablishmentRequest, the mobility state determined based on the system information is not included in the RRCSetupComplete.

3. A method, performed by a base station, of receiving a report on a mobility state, the method comprising:
generating system information including a parameter speedStateReselectionPars for determining a mobility state of a wireless terminal;
transmitting, to the wireless terminal in a radio resource control (RRC) inactive state, the system information including the parameter speedStateReselectionPars for determining the mobility state of the wireless terminal;
receiving, from the wireless terminal, at least one of an RRC connection resume request message (RRCResumeRequest) or an RRC connection resume request message1 (RRCResumeRequest1);

transmitting, to the wireless terminal, a first RRC connection setup message (RRCSetup) in response to the at least one of the RRCResumeRequest or the RRCResumeRequest1; and receiving, from the wireless terminal, an RRC connection setup complete message (RRCSetupComplete), wherein, based on reception of the RRCSetupComplete in response to the first RRCSetup, the mobility state of the wireless terminal is included in the RRCSetupComplete.

4. The method of claim 3, further comprising:

receiving, from the wireless terminal, an RRC connection reestablishment request message (RRCReestablishmentRequest); and transmitting, to the wireless terminal, a second RRCSetup in response to the RRCReestablishmentRequest, wherein, based on reception of the RRCSetupComplete in response to the second RRCSetup, the mobility state of the wireless terminal is not included in the RRCSetupComplete.

5. A wireless terminal for reporting a mobility state, the wireless terminal comprising:

a memory;

a transceiver; and at least one processor configured to:

receive, from a base station, system information including a parameter speedStateReselectionPars for determining a mobility state of the wireless terminal, determine the mobility state of the wireless terminal based on the system information, transmit, to the base station, at least one of a radio resource control (RRC) connection resume request message (RRCResumeRequest) or an RRC connection resume request message1 (RRCResumeRequest1) in an RRC inactive state, receive, from the base station, an RRC connection setup message (RRCSetup) in response to the at least one of the RRCResumeRequest or the RRCResumeRequest1, and transmit, to the base station, an RRC connection setup complete message (RRCSetupComplete), wherein, based on reception of the RRCSetup in response to the at least one of the RRCResumeRequest or the RRCResumeRequest1, the mobility state determined based on the system information is included in the RRCSetupComplete.

6. The wireless terminal of claim 5, wherein the at least one processor is further configured to transmit, to the base station, an RRC connection reestablishment request message (RRCReestablishmentRequest), and wherein, based on reception of the RRCSetup in response to the RRCReestablishmentRequest, the mobility state determined based on the system information is not included in the RRCSetupComplete.

7. A base station for receiving a report on a mobility state, the base station comprising:

a memory;

a transceiver; and at least one processor configured to:

generate system information including a parameter speedStateReselectionPars for determining a mobility state of a wireless terminal, transmit, to the wireless terminal in a radio resource control (RRC) inactive state, the system information including the parameter speedStateReselectionPars for determining the mobility state of the wireless terminal, receive, from the wireless terminal, at least one of an RRC connection resume request message (RRCResumeRequest) or an RRC connection resume request message1 (RRCResumeRequest1), transmit, to the wireless terminal, a first RRC connection setup message (RRCSetup) in response to the at least one of the RRCResumeRequest or the RRCResumeRequest1, and receive, from the wireless terminal, an RRC connection setup complete message (RRCSetupComplete), wherein, based on reception of the RRCSetupComplete in response to the first RRCSetup, the mobility state of the wireless terminal is included in the RRCSetupComplete.

8. The base station of claim 7, wherein the at least one processor is further configured to;

receive, from the wireless terminal, an RRC connection reestablishment request message (RRCReestablishmentRequest), and transmit, to the wireless terminal, a second RRCSetup in response to the RRCReestablishmentRequest, wherein, based on reception of the RRCSetupComplete in response to the second RRCSetup, the mobility state of the wireless terminal is not included in the RRCSetupComplete.

9. The base station of claim 7, wherein the mobility state of the wireless terminal is determined at the wireless terminal based on the system information.

10. The method of claim 3, wherein the mobility state of the wireless terminal is determined at the wireless terminal based on the system information.

* * * * *